(12) United States Patent
Oda et al.

(10) Patent No.: US 11,228,426 B2
(45) Date of Patent: Jan. 18, 2022

(54) COMMUNICATION DEVICE THAT PERFORMS ENCRYPTED COMMUNICATION AND COMMUNICATION SYSTEM

(71) Applicant: FUJITSU LIMITED, Kawasaki (JP)

(72) Inventors: Shoichiro Oda, Fuchu (JP); Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 308 days.

(21) Appl. No.: 16/506,156

(22) Filed: Jul. 9, 2019

(65) Prior Publication Data
US 2020/0036518 A1    Jan. 30, 2020

(30) Foreign Application Priority Data

Jul. 25, 2018 (JP) .............................. JP2018-139014

(51) Int. Cl.
*H04L 29/06* (2006.01)
*H04L 9/06* (2006.01)
(Continued)

(52) U.S. Cl.
CPC ............ *H04L 9/0656* (2013.01); *G06F 7/582* (2013.01); *H04B 10/2507* (2013.01); *H04L 9/0847* (2013.01)

(58) Field of Classification Search
CPC . H04L 9/0656; H04L 9/0847; H04B 10/2507; G06F 7/582
(Continued)

(56) References Cited

U.S. PATENT DOCUMENTS 5,666,419 A    9/1997  Yamamoto et al.
7,831,049 B1   11/2010 Kanter
(Continued)

FOREIGN PATENT DOCUMENTS

JP    H07-193565    7/1995
JP    2000-209196   7/2000
(Continued)

OTHER PUBLICATIONS

Gregory S. Kanter et al., "Practical Physical-Layer Encryption: The Marriage of Optical Noise with Traditional Cryptography", IEEE Communications Magazine (vol. 47, Issue: 11, pp. 74-81, Nov. 2009), (8 pages).
(Continued)

*Primary Examiner* — Evans Desrosiers
(74) *Attorney, Agent, or Firm* — Fujitsu Patent Center

(57) ABSTRACT

A communication device includes: a counter, a pseudo-random number generator, a symbol generator, a modulator, and a controller. The counter counts symbols transmitted to a correspondent device. The pseudo-random number generator generates a pseudo-random number corresponding to a count value of the counter. The symbol generator generates a transmission symbol from a transmission signal and the pseudo-random number. The modulator generates a modulated signal from the transmission symbol. When a disruption of a communication with the correspondent device is detected, the controller selects, from among a plurality of restoring times determined in advance, a restoring time for resuming the communication, and gives the counter a count value assigned in advance to the selected restoring time. The counter resumes a counting operation from the count value given from the controller when the communication device resumes a communication with the correspondent device.

8 Claims, 27 Drawing Sheets

NODE A                                    NODE B

(51) Int. Cl.
    *H04B 10/2507*     (2013.01)
    *H04L 9/08*     (2006.01)
    *G06F 7/58*     (2006.01)

(58) Field of Classification Search
    USPC .......................................................... 713/189
    See application file for complete search history.

(56) References Cited

U.S. PATENT DOCUMENTS

| | | | | |
|---|---|---|---|---|
| 2004/0207761 | A1* | 10/2004 | Paik | H03G 3/3068 |
| | | | | 348/678 |
| 2008/0044011 | A1* | 2/2008 | Yoshida | H04L 25/4917 |
| | | | | 380/28 |
| 2014/0047497 | A1* | 2/2014 | Casas | H04N 21/2383 |
| | | | | 725/151 |

FOREIGN PATENT DOCUMENTS

| | | |
|---|---|---|
| JP | 2002-164883 | 6/2002 |
| JP | 2014-093764 | 5/2014 |
| JP | 2017-050678 | 3/2017 |

OTHER PUBLICATIONS

Ken Tanizawa et al., IEICE Communications Express, vol. 7, No. 1, 1-6 (2018), "Digital feedforward carrier phase estimation for PSK Y-00 quantum-noise randomized stream cipher" (36 pages).

* cited by examiner

| SIGNAL DISRUPTION TIME | NEXT RESTORING TIME |
|---|---|
| 000000~000010 | 000025 |
| 000010~000020 | 000035 |
| 000020~000030 | 000045 |
| ⋮ | ⋮ |

F I G. 3 A

| RESTORING TIME | RESET COUNT VALUE (k) |
|---|---|
| 000025 | 0003500000 |
| 000035 | 0004500000 |
| 000045 | 0005500000 |
| ⋮ | ⋮ |

F I G. 3 B

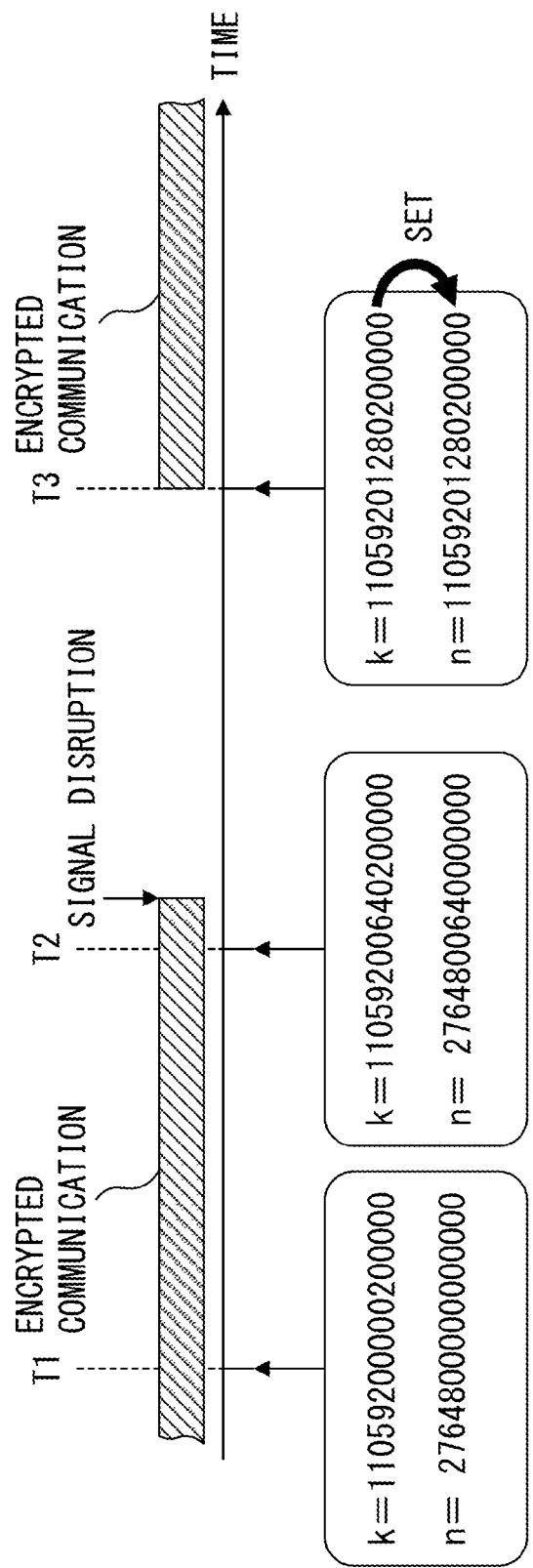
F I G. 4

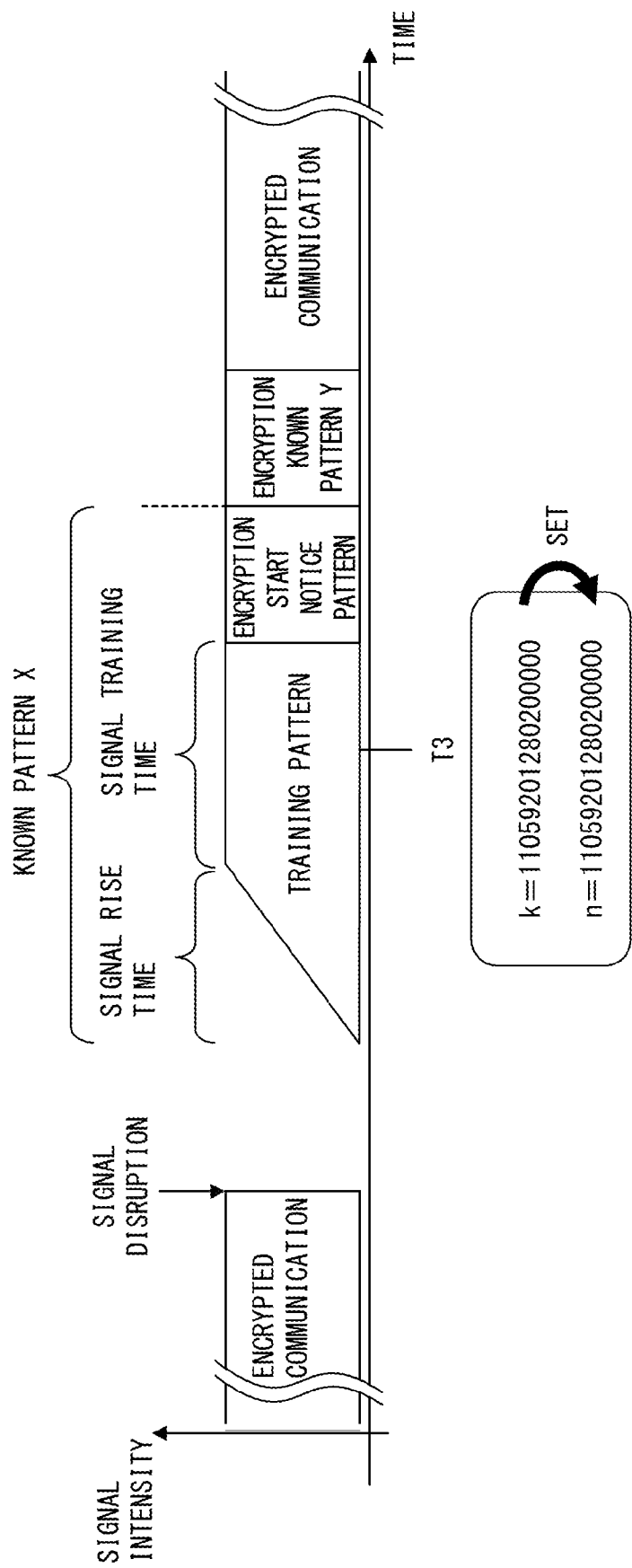
F I G. 5

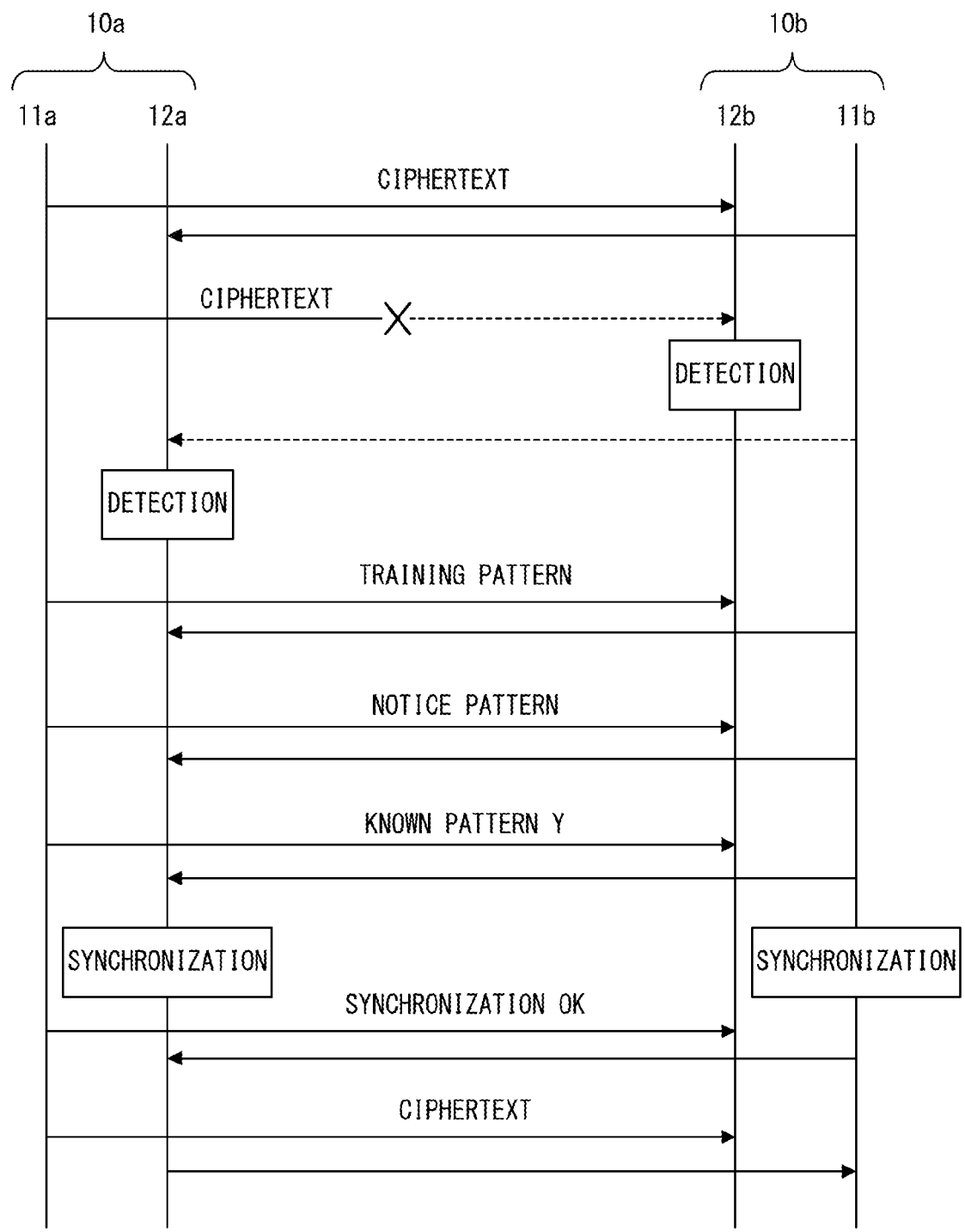
F I G. 7

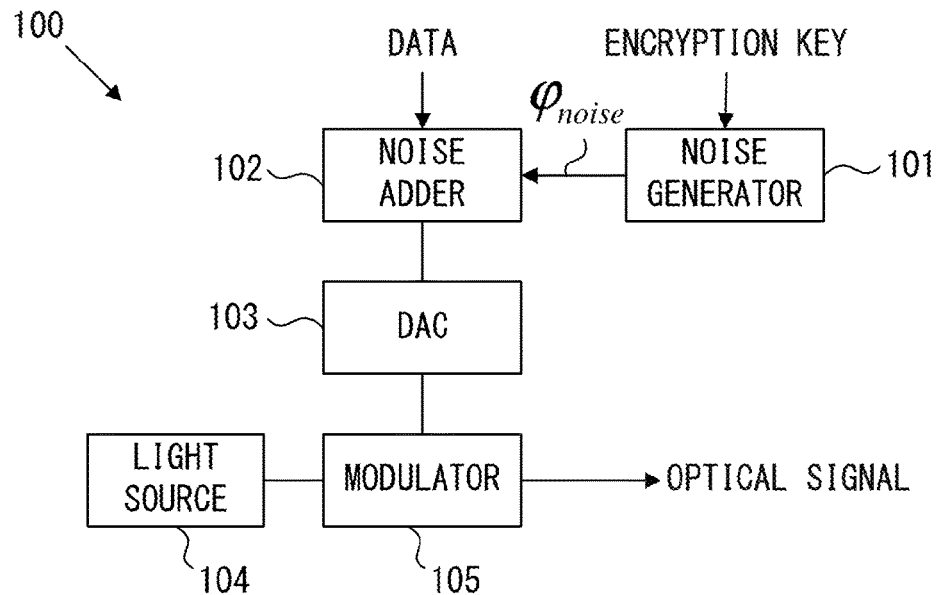
F I G. 1 0 A
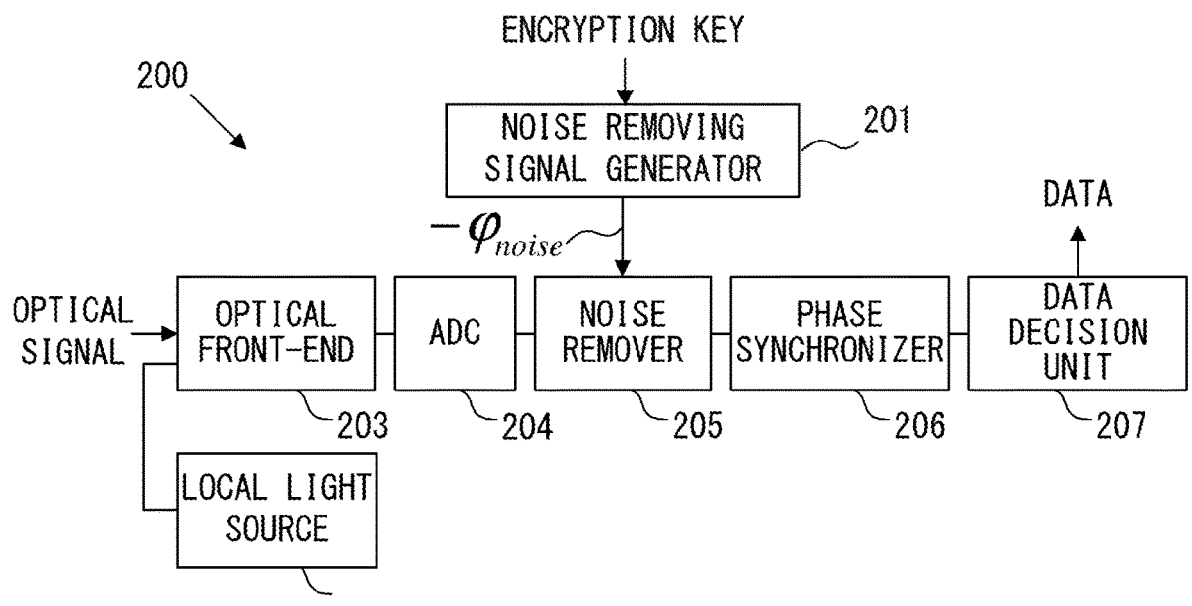
F I G. 1 0 B

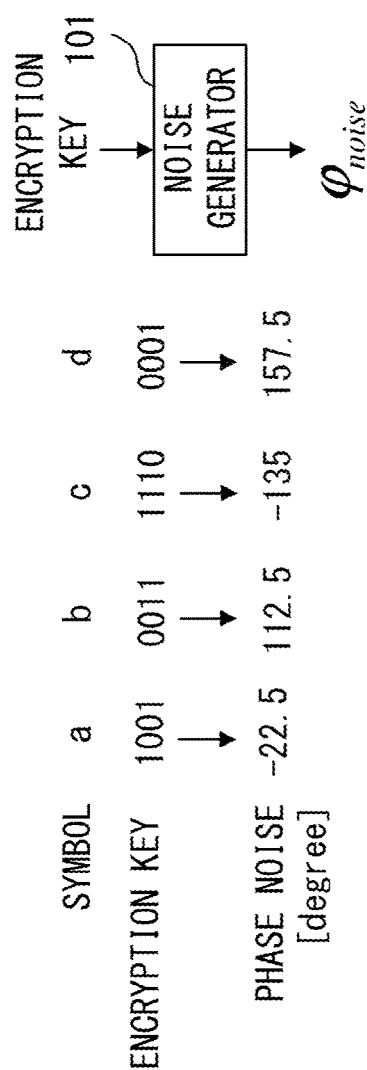
F I G. 1 1

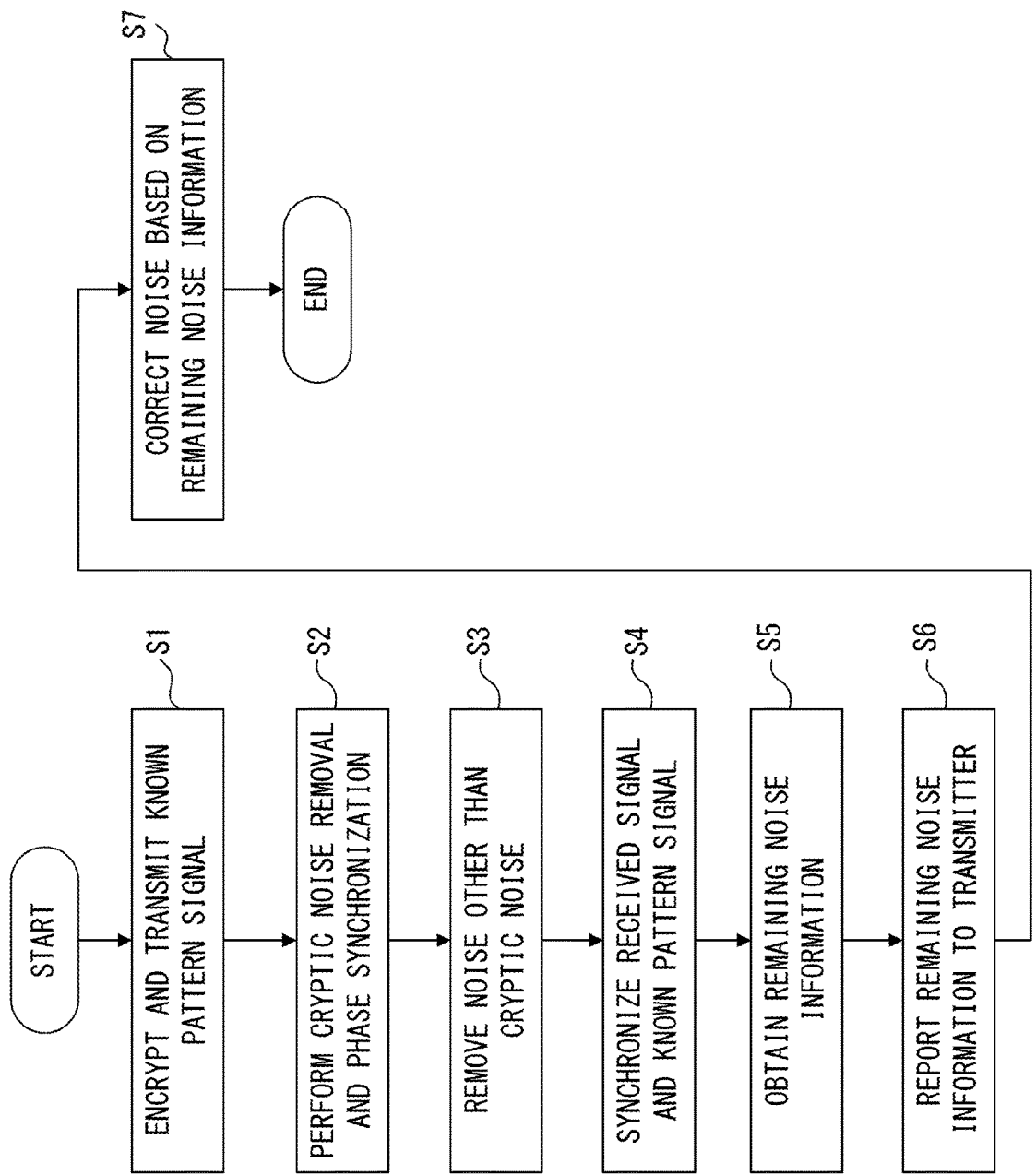
F I G. 17

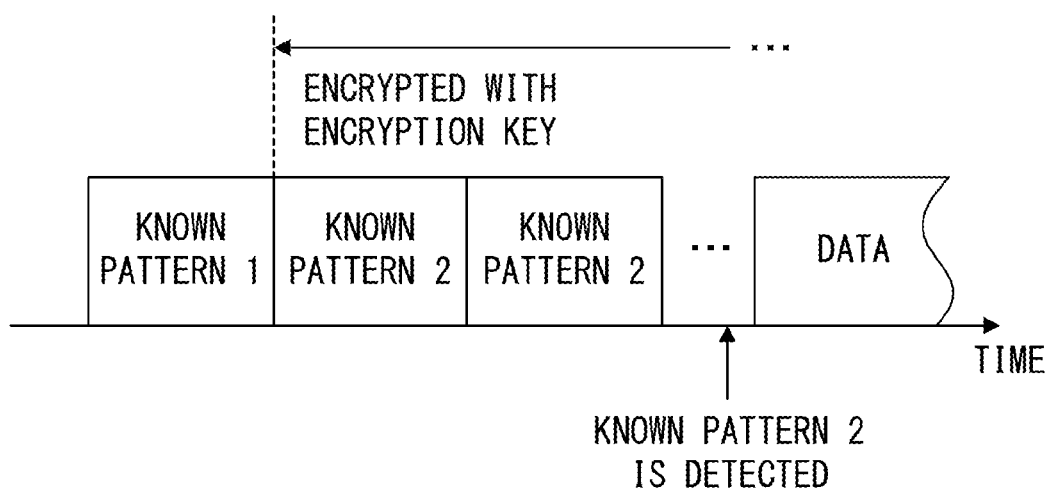
F I G. 2 1

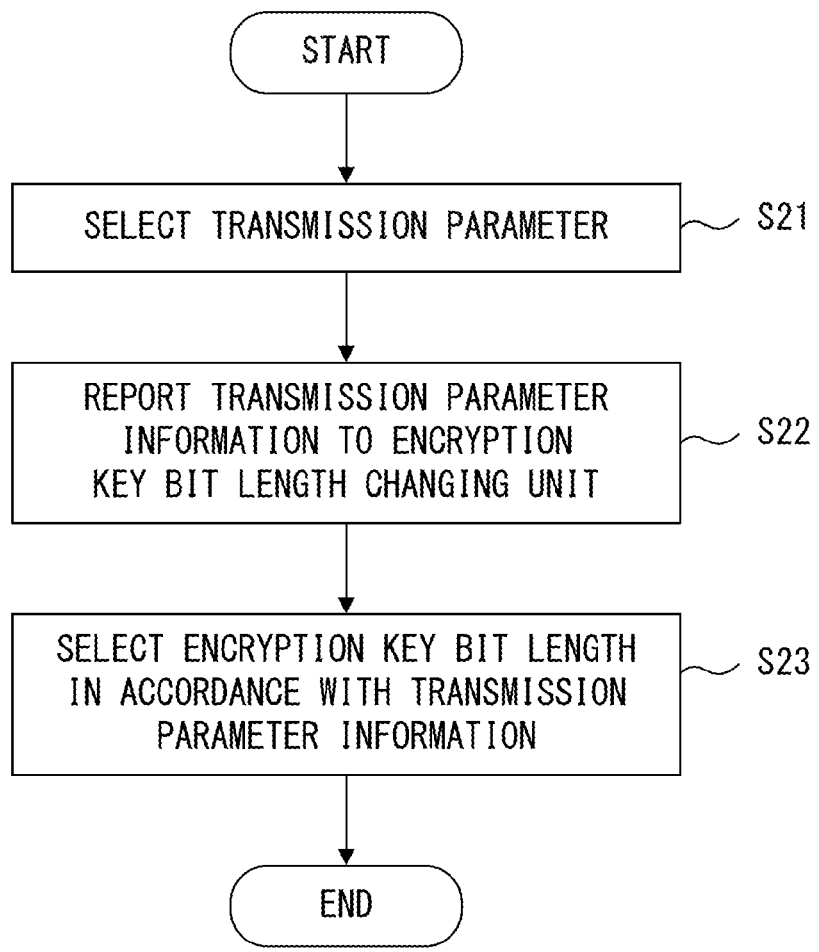
F I G. 2 4

| ENCRYPTION KEY | POLARIZATION ROTATION [degree] |
|---|---|
| 0000 | 90 |
| 0001 | 78.75 |
| 0010 | 67.5 |
| 0011 | 56.25 |
| 0100 | 45 |
| 0101 | 33.75 |
| 0110 | 22.5 |
| 0111 | 11.25 |
| 1000 | 0 |
| 1001 | −11.25 |
| 1010 | −22.5 |
| 1011 | −33.75 |
| 1100 | −45 |
| 1101 | −56.25 |
| 1110 | −67.5 |
| 1111 | −78.75 |

FIG. 26

COMMUNICATION DEVICE THAT PERFORMS ENCRYPTED COMMUNICATION AND COMMUNICATION SYSTEM

CROSS-REFERENCE TO RELATED APPLICATION

This application is based upon and claims the benefit of priority of the prior Japanese Patent Application No. 2018-139014, filed on Jul. 25, 2018, the entire contents of which are incorporated herein by reference.

FIELD

The embodiments discussed herein are related to a communication device that performs encrypted communications, a communication system, and a device and a method for optical transmission.

BACKGROUND

Various encryption schemes have been in practical use for secure communications. In many cases of encrypted communications, pseudo-random numbers are used.

FIG. 1A illustrates an example of encrypted communications. In this example, a transmitter node includes a pseudo-random number generator 1001 and an encrypter 1002. The pseudo-random number generator 1001 generates pseudo-random numbers (running key) based on a seed (seed key). The encrypter 1002 generates cipher text signals from plain text data by using the pseudo-random numbers generated by the pseudo-random number generator 1001. A receiver node includes a pseudo-random number generator 1011 and a decrypter 1012. The pseudo-random number generator 1011 generates pseudo-random numbers based on a seed. The decrypter 1012 decrypts the cipher text signals by using the pseudo-random numbers generated by the pseudo-random number generator 1011. Here, the decrypter 1012 can regenerate the plain text data from the cipher text signals when the same seed is given to the transmitter node and the receiver node and pseudo-random number synchronization is established between the two nodes.

For example, the use of a self-synchronizing stream cipher enables encrypted communications in which pseudo-random number synchronization can be automatically established between the transmitter node and the receiver node. Alternatively, the transmitter node and the receiver node may exchange (share) seeds by using a public key cryptography. In this case, pseudo-random number synchronization can be established between the transmitter node and the receiver node using pseudo-random numbers generated from a new seed shared by using a public key cryptography in order from the pseudo-random numbers generated first. Note that encrypted communications using pseudo-random numbers are disclosed, for example, in Japanese Laid-open Patent Publication No. 7-193565 and Japanese Laid-open Patent Publication No. 2000-209196.

Researches on physical layer encryption have been advancing in recent years. The physical layer encryption allows data encryption in the physical layer by utilizing, for example, quantum fluctuation (i.e., noise) of light. Y-00 protocol, which is a quantum cryptography, is an example of the physical layer encryption.

FIG. 1B illustrates an example of communications using physical layer encryption. In this example, a transmitter node includes a pseudo-random number generator 1001, a symbol decision unit 1021, a light source 1022, a modulator 1023, and an optical amplifier 1024. The symbol decision unit 1021 decides a transmission symbol based on plain text data. At that time, the transmission symbol is affected by pseudo-random numbers generated by the pseudo-random number generator 1001. The modulator 1023 modulates continuous wave light output from the light source 1022 with the transmission symbol affected by pseudo-random numbers and generates optical signals. In this manner, noise that corresponds to the pseudo-random numbers is added to the optical signals. The optical amplifier 1024 amplifies the optical signals.

A receiver node includes a pseudo-random number generator 1011, an optical receiver 1031, and a signal decision unit 1032. The optical receiver 1031 converts a received optical signal into an electric signal. The signal decision unit 1032 removes noise from the received signal by using pseudo-random numbers generated by the pseudo-random number generator 1011 and thereby regenerates symbols. The signal decision unit 1032 can regenerate plain text data when the same seed is given to the transmitter node and the receiver node and pseudo-random number synchronization is established between the two nodes.

Note that the physical layer encryption is disclosed, for example, in Japanese Laid-open Patent Publication No. 2017-50678, Japanese Laid-open Patent Publication No. 2002-164883, U.S. Pat. No. 7,831,049, Japanese Laid-open Patent Publication No. 2014-93764, and the following Documents 1 and 2.

Document 1: G. S. Kanter et al., Practical Physical-Layer Encryption: The Marriage of Optical Noise with Traditional Cryptography, IEEE Communications Magazine (Volume; 47, Issue: 11, pp. 74-81, November 2009)

Document 2: K. Tanizawa et al., IEICE Communications Express, Vol. 7, No. 1, 1-6, Digital feedforward carrier phase estimation for PSK Y-00 quantum-noise randomized stream cipher In the encrypted communication system in FIG. 1A or FIG. 1B, pseudo-random number synchronization needs to be established between a transmitter node and a receiver node. In physical layer encryption, however, noise that corresponds to pseudo-random numbers is added to an optical signal and therefore the receiver node is unable to obtain cipher text per se. For that reason, it is difficult to apply the self-synchronizing stream cipher to the physical layer encryption.

The above problem may be solved by using pseudo-random numbers in order from pseudo-random numbers that are generated first after a transmitter node and a receiver node exchange (share) a seed by means of a public key cryptography. However, the security level of a public key cryptography depends on an amount of calculation for decryption. Meanwhile, physical layer encryption, in many cases, is introduced for the security independent of an amount of calculation. When procedures to exchange a seed by a public key cryptography is employed, the security level of physical layer encryption becomes dependent on the amount of calculation.

As described above, with the conventional technologies, pseudo-random number synchronization for physical layer encryption may not be established between a transmitter node and a receiver node. Thus, when a communication is temporarily disrupted due to a failure occurrence, switching redundant systems or other causes, resuming of the encrypted communication may be difficult. Note that this problem is not limited to the resuming of encryption communications.

SUMMARY

According to an aspect of the present invention, a communication device communicates with a correspondent device. The communication device includes: a counter configured to count symbols transmitted to the correspondent device; a pseudo-random number generator configured to generate a pseudo-random number corresponding to a count value of the counter; a symbol generator configured to generate a transmission symbol from a transmission signal and the pseudo-random number generated by the pseudo-random number generator; a modulator configured to generate a modulated signal from the transmission symbol generated by the symbol generator; and a controller configured to select, when a disruption of a communication with the correspondent device is detected, a restoring time for resuming the communication based on a time at which the disruption of the communication is detected, the restoring time being selected from among a plurality of restoring times determined in advance, and to give the counter a count value assigned in advance to the selected restoring time. The counter resumes a counting operation from the count value given from the controller when the communication device resumes a communication with the correspondent device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A illustrates an example of a signal disruption time-restoring time table;

FIG. 3B illustrates an example of a restoring time-count value table;

FIG. 4 illustrates an example of disruption and resuming of an encrypted communication;

FIG. 5 illustrates an example of procedures for resuming an encrypted communication;

FIG. 7 is a sequence diagram illustrating another example of procedures for resuming an encrypted communication;

FIG. 10A illustrates an example of a transmitter that implements physical layer encryption;

FIG. 10B illustrates an example of a receiver that implements physical layer encryption;

FIG. 11 illustrates an example of a method of generating a phase noise from an encryption key;

FIG. 17 is a flowchart illustrating an example of encrypted communications according to the first embodiment;

FIG. 21 illustrates an example of a method of adjusting a timing of noise removing signals;

FIG. 24 is a flowchart illustrating an example of a method of optimizing an encryption key bit length;

FIG. 26 illustrates an example of a method of converting an encryption key into polarization rotation.

DESCRIPTION OF EMBODIMENTS

Figure 1A:
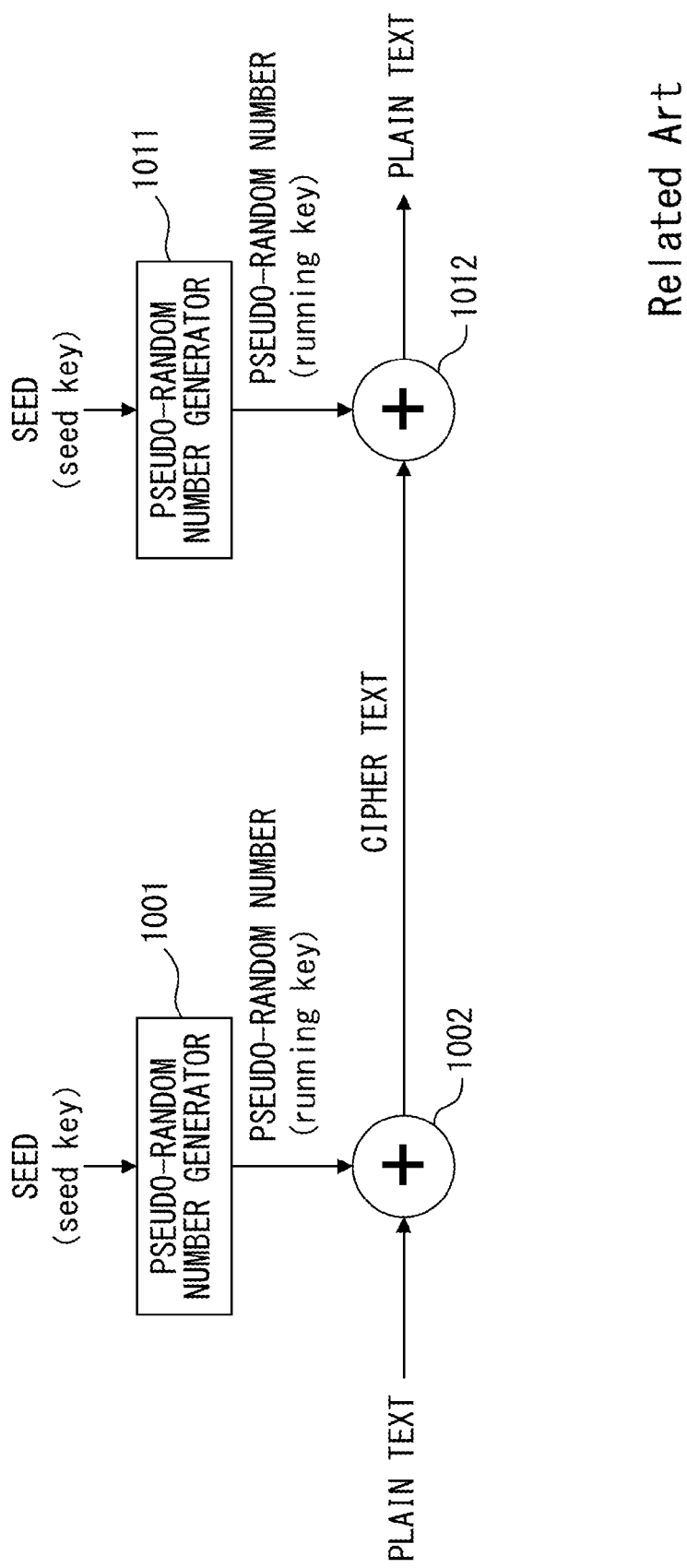
FIG. 1A and FIG. 1B illustrate examples of encrypted communications.
Figure 1B:
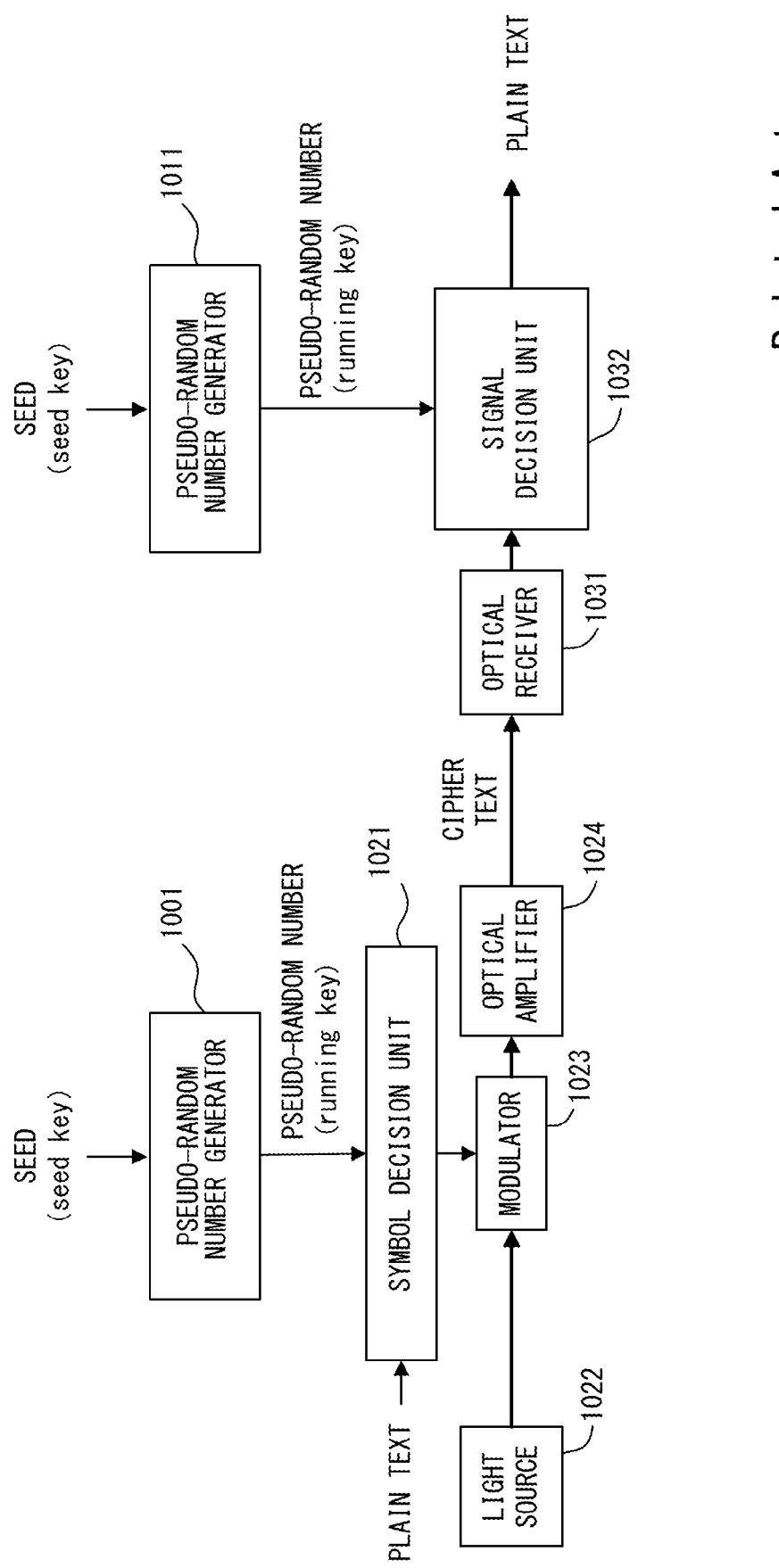
Figure 2:
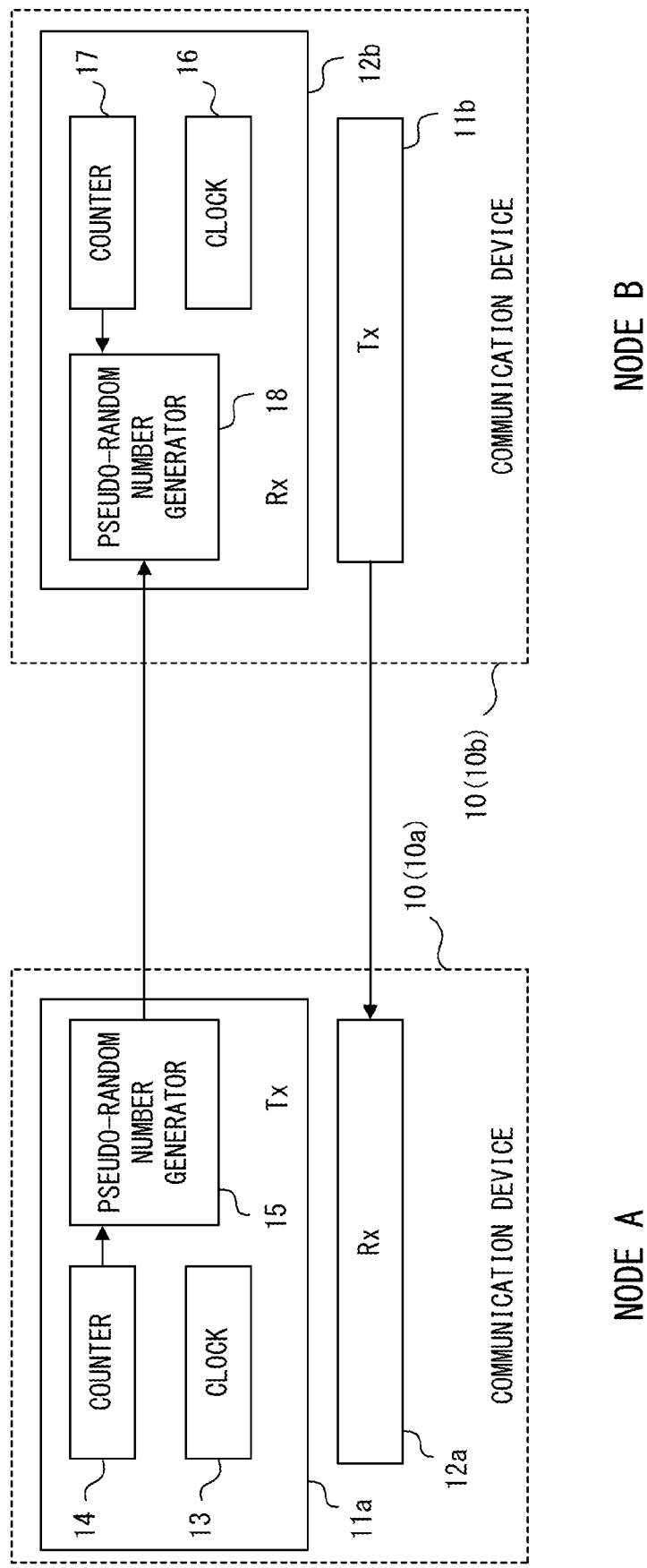
FIG. 2 illustrates an example of an encrypted communication system according to the embodiment.

FIG. 2 illustrates an example of an encrypted communication system according to the embodiment. In this embodiment, bidirectional encrypted communications are performed between a communication device 10 (10a) installed in a node A and a communication device 10 (10b) installed in a node B. Each of the communication devices 10 is implemented by an optical transmitter device including an optical transceiver as an example.

The communication device 10a includes a transmitter (Tx) 11a and a receiver (Rx) 12a. The communication device 10b includes a transmitter (Tx) 11b and a receiver (Rx) 12b. Signals transmitted from the transmitter 11a are received by the receiver 12b. Signals transmitted from the transmitter 11b are received by the receiver 12a.

The transmitter 11a includes a clock 13, a counter 14, and a pseudo-random number generator 15. The clock 13 gives a time that has elapsed since activation of the clock 13. The counter 14 counts the number of symbols transmitted by the transmitter 11a. The pseudo-random number generator 15 generates a pseudo-random number corresponding to a count value output from the counter 14. By using the pseudo-random numbers, the transmitter 11a generates cipher text signals from plain text data.

The receiver 12b includes a clock 16, a counter 17, and a pseudo-random number generator 18. The clock 16 gives a time that has elapsed since activation of the clock 16. The counter 17 counts the number of symbols received by the receiver 12b. The pseudo-random number generator 18 generates a pseudo-random number corresponding to a count value output from the counter 17. By using the pseudo-random numbers, the receiver 12b decrypts the cipher text signals transmitted from the transmitter 11a and regenerates the plain text data.

Note that the transmitter 11a and the transmitter 11b have substantially the same configuration. The receiver 12a and the receiver 12b have substantially the same configuration. The encrypted communications between the transmitter 11b and the receiver 12a are substantially the same as the encrypted communications between the transmitter 11a and the receiver 12b. For that reason, an explanation of the configurations and the operations of the transmitter 11b and the receiver 12a is omitted.

In the encrypted communications between the transmitter 11a and the receiver 12b, the pseudo-random numbers generated in the node A and the pseudo-random numbers generated in the node B need to be in synchronization with each other. In other words, a pseudo-random number for the transmitter 11a to encrypt a symbol need to be the same as a pseudo-random number for the receiver 12b to decrypt the symbol. In the following description, pseudo-random number synchronization between the transmitter 11a and the receiver 12b is described.

The clock 13 and the clock 16 need to be activated at the same time. For example, the clock 13 and the clock 16 are activated at the same time when the communication device 10a and the communication device 10 are shipped. The clock 13 and the clock 16 always keep substantially the same time after they are activated. However, the time kept by the clock 13 and the time kept by the clock 16 have a margin of error. The margin of error (i.e., the accuracy) of the clock 13 is preferably the same as that of the clock 16 but can be different. For example, the accuracy of an atomic clock is about $10^{-11}$. The accuracy of a clock that uses a crystal oscillator or an MEMS oscillator is about $10^{-7}$. Note that each of the clock 13 and the clock 16 may be implemented by a counter that counts up according to clock signals of a specific frequency.

Each of the communication devices 10a and 10b has a tamper-proof structure and includes a power source to operate the clock 13 or 16. A battery or a capacitor, for example, is implemented as the power source. The clocks 13 and 16 are installed within the tamper-proof structures of the communication devices 10a and 10b, respectively. The battery or the capacitor is charged before shipment of the communication device 10a and the communication device 10b. The clocks 13 and 16 will not stop during transportation until the communication device 10a and the communication device 10b are installed at specified installation sites. After the communication device 10a and the communication device 10b are installed at specified installation sites, the battery or the capacitor may be recharged, and a specific amount of power is supplied to the clocks 13 and 16 in case of power outage. In other words, once the clocks 13 and 16 are activated before shipment, the clocks will not stop until the end of a life of the communication device 10a and a life of the communication device 10b. The time kept by the clock 13 and the time kept by the clock 16 will not be reset.

The counter 14 counts the number of symbols transmitted by the transmitter 11a. The transmitter 11a can reset the count value of the counter 14 to a specific value, which is determined in advance. In similar manner, the counter 17 counts the number of symbols received by the receiver 12b. The receiver 12b can reset the count value of the counter 17 to a specific value, which is determined in advance.

The pseudo-random number generators 15 and 18 generate pseudo-random numbers specified by counter values of the corresponding counters 14 and 17. The pseudo-random number generators 15 and 18 perform the following operations.
(1) When a count value n is given, a pseudo-random number corresponding to the count value n can be generated even when a count value smaller than n has not been given previously.
(2) The pseudo-random number generated in response to the count value n is not predicted from pseudo-random numbers generated in response to a count value 1 to a count value n−1.

A BBS (Blum-Blum-Shub) generator, for example, may be implemented as the pseudo-random number generators that can accomplish (1) and (2).

In the encrypted communication system with the above-described configuration, pseudo-random number synchronization needs to be established between the transmitter 11a and the receiver 12b when an encrypted communication is started or resumed. For example, when an encrypted communication is resumed, pseudo-random number synchronization needs to be established between the time at which the transmitter 11a starts to transmit signals and the time at which the receiver 12b starts to receive the signals.

In the present embodiment, the same restoring time is set to both the transmitter 11a and the receiver 12b. The restoring time represents the time for resuming an encrypted communication. The restoring time may represent, for example, a time point from the time at which the clocks 13 and 16 have been activated. Moreover, the restoring time is set at specific time intervals. A time interval I between the restoring times is determined to satisfy the following condition.

$$I \geq E \times (AT + AR)$$

Here, E represents an elapsed time from the time at which the clocks 13 and 16 were activated to the restoring time. AT represents the accuracy of the clock 13 installed in the transmitter 11a and AR represents the accuracy of the clock 16 installed in the receiver 12b. The time interval I between the restoring times is a period of time longer than a period of time obtained by multiplying the sum of the accuracy of the clock 13 and the accuracy of the clock 16 by the elapsed time from the activation of the clocks 13 and 16. In other words, the time interval I between the restoring times needs to be greater than the maximum value of the time difference between the clocks 13 and 16, which is caused by a margin of error in the clocks 13 and 16.

Note that in order to make the time interval I longer than the time difference between the clocks 13 and 16, which is caused by a margin of error in the clocks 13 and 16, the elapsed time E may be, for example, "the longest period of time in which the communication device 10 operates (i.e., a life of the device)". In this case, the time interval I is uniquely determined in accordance with the accuracies of the clocks 13 and 16.

As an example, when a life of each of the communication devices 10a and 10b is 20 years and the accuracies of the clocks 13 and 16 are $10^{-11}$, in a period of 20 years that has elapsed since the start of the operations of the communication devices 10a and 10b, the maximum value of the time difference between the clocks 13 and 16 is 12.6 milliseconds (20 years×($10^{-11}+10^{-11}$)). In this case, the time interval I may be set to about 20 milliseconds.

In a case in which the accuracies of the clocks 13 and 16 are $10^{-7}$, the maximum value of the time difference between the clocks 13 and 16 is 126 seconds (20 years×($10^{-7}+10^{-7}$)). In this case, the time interval I may be set to about 2 minutes and 30 seconds.

As described above, the restoring time is set at specific time intervals from the time at which the clocks 13 and 16 were activated. The restoring time is used when an encrypted communication that has been disrupted is resumed. More specifically, when the communication devices 10a and 10b detect disruption of an encrypted communication, the communication devices 10a and 10b determine the time at which the encrypted communication is resumed. At that time, the communication devices 10a and 10b select a restoring time corresponding to the time at which the encrypted communication was disrupted from among the restoring times set at specific time intervals. At the selected restring time, the communication devices 10a and 10b resume the encrypted communication. Accordingly, in this encrypted communication system, the correspondence relations between the time at which an encrypted communication was disrupted and the restoring time are determined in advance.

FIG. 3A illustrates an example of a signal disruption time-restoring time table that represents correspondence relations between the time at which an encrypted communication is disrupted and the restoring time. The signal disruption time represents a time period in which disruption of an encrypted communication is detected. The next restoring time represents a restoring time to be selected as the time at which the encrypted communication is resumed. For example, when disruption of an encrypted communication was detected at the time of "000015", "000035" is selected as a restoring time at which the encrypted communication is resumed. Since the communication devices 10a and 10b have the same signal disruption time-restoring time table, the communication devices 10a and 10b select the same restoring time when disruption of an encrypted communication is detected almost at the same time by the communication devices 10a and 10b.

The transmitter 11a and the receiver 12b resume an encrypted communication at the restoring time selected in the manner described above. Here, the encrypted communication can be performed by using pseudo-random numbers generated by the pseudo-random number generators 15 and 18. The pseudo-random number generators 15 and 18 generate pseudo-random numbers that correspond to count values of the corresponding counters 14 and 17. At the time of resuming an encrypted communication, the communication devices 10a and 10b need to obtain the same count value.

FIG. 3B illustrates an example of a restoring time-count value table that represents correspondence relations between the restoring time and the count value used at the time of resuming encrypted communications. A reset count value k is uniquely assigned to each restoring time. More specifically, the reset count value k is determined to satisfy the following condition.

$$k \geq E \times \{1+\text{Max}(AT,AR)\} \times SR \times \alpha$$

Here, E represents the elapsed time from the time at which the clocks 13 and 16 were activated to the restoring time. AT represents the accuracy of the clock 13 installed in the transmitter 11a and AR represents the accuracy of the clock 16 installed in the receiver 12b. Max(x,y) represents a function for outputting a variable x or a variable y, whichever is larger. SR represents a symbol rate. α represents a safety coefficient and is 1 or a real number larger than 1. Note that α is not always necessary in the conditional expression to determine the reset count value k.

A reset count value k that satisfies the above condition is always larger than the count values that the counters 14 and 17 outputted in the past. In other words, the reset count value k is determined so as to be always larger than the count values that the counters 14 and 17 outputted in the past. Since the pseudo-random number generators 15 and 18 generate pseudo-random numbers that correspond to a given count value, when a reset count value k is given to the pseudo-random number generators 15 and 18 at the time of resuming an encrypted communication, the pseudo-random number generators 15 and 18 generate pseudo-random numbers based on the count value k, which has not been input in the past.

For example, when disruption of an encrypted communication is detected at the time of "000015", a restoring time "000035" is selected according to the signal disruption time-restoring time table in FIG. 3A. The restoring time "000035" is converted into a reset count value "0004500000" according to the restoring time-count value table in FIG. 3B. In this case, the encrypted communication is resumed from the pseudo-random numbers corresponding to the count value "0004500000".

Here, the count value "0004500000" is larger than any of the count values that the counters 14 and 17 have outputted in the past. After the encrypted communication is resumed, the count value will be incremented from this value. In this manner, the pseudo-random numbers used after resuming of an encrypted communication will not overlap with the pseudo-random numbers that were used before disruption of the encrypted communication. As a result, a highly reliable encrypted communication can be accomplished.

Note that the transmitter 11a and the receiver 12b have the same signal disruption time-restoring time table. The transmitter 11a and the receiver 12b also have the same restoring time-count value table. When the transmitter 11a and the receiver 12b detect signal disruption almost at the same time, the same restoring time is selected and the same reset count value k is obtained in the transmitter 11a and the receiver 12b. Accordingly, when generation of pseudo-random numbers is started by using the same reset count value k in both the transmitter 11a and the receiver 12b, pseudo-random number synchronization can be established.

FIG. 4 illustrates an example of disruption and resuming of an encrypted communication. In the present embodiments, the restoring times T1, T2, T3, . . . are determined in advance. Note that time intervals between the restoring times are constant (e.g., 20 milliseconds). For each restoring time, a reset count value k is determined in advance. Each reset count value k is determined to satisfy the above condition. For example, a reset count value k for the restoring time T1 is set to be a value larger than the count value obtained by the counters 14 and 17 under the assumption that the encrypted communication had been performed continuously from activation of the clocks 13 and 16 to the restoring time T1. Similarly, a resent count value k for the restoring time T2 is set to be a value larger than the count value obtained by the counters 14 and 17 under the assumption than the encrypted communication had been performed continuously from activation of the clocks 13 and 16 to the restoring time T2.

During an encrypted communication between the communication devices 10a and 10b, a count value n in each of the counters 14 and 17 is incremented by 1 for every transmission of a symbol. In the present embodiments, the count value n is "2764800000000000" at the time T1 and is increased to "2764800640000000" at the time T2.

Assume that disruption of the encrypted communication is detected after T2. The communication devices 10a and 10b selects a restoring time that corresponds to the time at which disruption of the encrypted communication is detected with reference to the signal disruption time-restoring time table in FIG. 3A. In the present embodiments, a restoring time T3 is selected. At that time, the selected restoring time may not necessarily be a restoring time that comes first from the time at which disruption of an encrypted communication is detected.

Next, the communication devices 10a and 10b obtain a reset count value k that is assigned to the selected restoring time T3 with reference to the restoring time-count value table in FIG. 3B. In the example of FIG. 4, "11059201280200000" is the reset count value k that is assigned to the restoring time T3. The communication devices 10a and 10b resets the count value n in each of the counters 14 and 17 to the reset count value k. More specifically, the count value in each of the counters 14 and 17 is updated from "n" to "k". Consequently, the count value in each of the counters 14 and 17 is updated to "11059201280200000".

The communication devices 10a and 10b resume the encrypted communication at the restoring time T3. At that time, the count value n in each of the counters 14 and 17 is "k". In other words, the count value n in the counter 14 and the count value n in the counter 17 are the same at the restoring time T3. After the resuming of the encrypted communication at the restoring time T3, the count value n in each of the counters 14 and 17 is incremented for every symbol and therefore the counters 14 and 17 will be kept being synchronized with each other. The pseudo-random number generators 15 and 18 generate pseudo-random numbers that correspond to the count value in the counters 14 and 17. In this manner, pseudo-random numbers are in synchronization with each other between the communication devices 10a and 10b. As a result, an encrypted communication between the communication devices 10a and 10b can be resumed.

FIG. 5 illustrates an example of procedures for resuming an encrypted communication. This example is under the assumption that an encrypted communication that propagates encrypted signals from the communication device 10a to the communication device 10b is disrupted. The example is also under the assumption that the communication device 10a and the communication device 10b detect the signal disruption almost at the same time.

As described with reference to FIG. 4, the communication devices 10a and 10b select the restoring time T3 based on the time at which the signal disruption is detected. The communication devices 10a and 10b also obtain a reset count value k that corresponds to the selected restoring time T3. The communication devices 10a and 10b then reset the counters 14 and 17 to the obtained reset count value k. In other words, the count values in the counter 14 and 17 are the same at this point in time.

The communication device 10a transmits a known pattern X. The known pattern X is propagated from the communication device 10a to the communication device 10b without being encrypted. The known pattern X includes a training pattern and an encryption start notice pattern. The training pattern is transmitted to establish signal synchronization between the communication devices 10a and 10b. A period of time in which the training pattern is transmitted is equal to the sum of a signal rise time and a signal training time. The signal rise time corresponds to a period of time needed to stabilize a signal and is determined in advance based on performance of the transmitter 11a and characteristics of a transmission channel. The signal training time corresponds to a period of time needed to establish signal synchronization in the receiver 12b and is determined in advance based on performance of the receiver 12b.

The encryption start notice pattern designates a time or a timing to start an encrypted communication. For example, the encryption start notice pattern designates "a timing at which m symbols have elapsed from the time at which the encryption start notice pattern is ended". In this case, an encrypted communication is started from the m-th symbol from a point in time at which the encryption start notice pattern is ended. Note that "m" may be zero. In this case, an encrypted communication is started from the symbol immediately after the end of the encryption start notice pattern.

Following the known pattern X, the communication device 10a transmits a known pattern Y. Transmission of the known pattern Y is started at a time or a timing designated by the encryption start notice pattern. The known pattern Y is encrypted for the transmission. Note that with the start of transmission of the known pattern Y, the counter 14 starts to count up and pseudo-random numbers that correspond to the count value of the counter 14 are generated in the communication device 10a.

The communication device 10b receives the encrypted known pattern Y. Here, the communication device 10b starts decryption processing in accordance with the encryption start notice pattern reported from the communication device 10a. More specifically, the communication device 10b starts the decryption processing at a time or a timing designated by the encryption start notice pattern. Note that with the start of reception of the known pattern Y, the counter 17 starts to count up and pseudo-random numbers that correspond to the count value of the counter 17 are generated in the communication device 10b. By using the pseudo-random numbers, the known pattern Y is decrypted.

When the known pattern Y is successfully decrypted, the communication device 10b determines pseudo-random number synchronization to be established between the communication devices 10a and 10b. In this case, the communication device 10b reports, to the communication device 10a, a synchronization OK signal that represents establishment of pseudo-random number synchronization. The synchronization OK signal is delivered through the encrypted communication. In the example of FIG. 2, the synchronization OK signal is encrypted and delivered from the transmitter 11b installed in the communication device 10b to the receiver 12a installed in the communication device 10a.

The communication device 10a that has received the synchronization OK signal from the communication device 10b starts transmission of encrypted payload. The encrypted communication between the communication devices 10a and 10b is thereby resumed.

Figure 6:
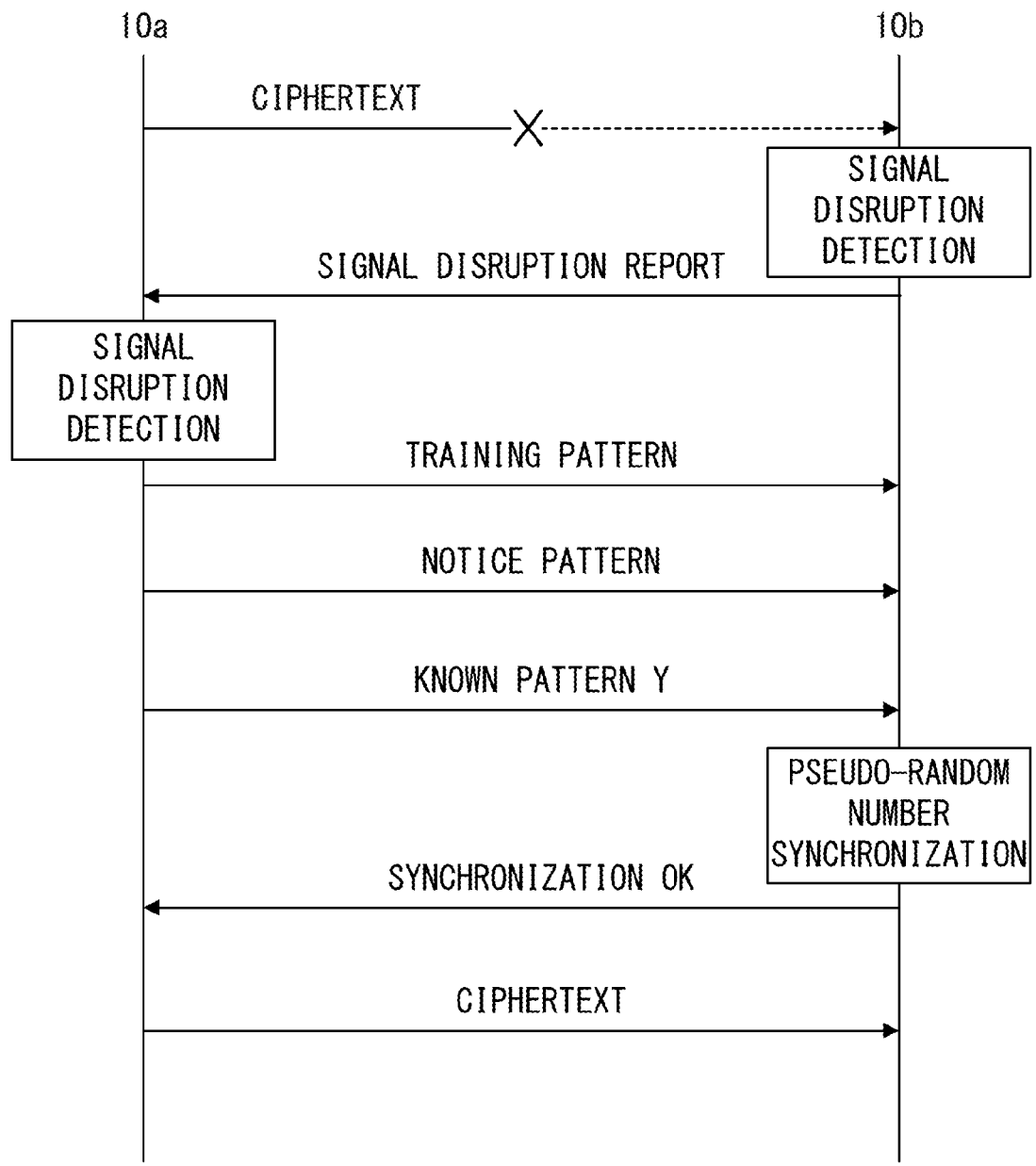
FIG. 6 is a sequence diagram illustrating an example of procedures for resuming an encrypted communication.

FIG. 6 is a sequence diagram illustrating an example of procedures for resuming an encrypted communication. This sequence diagram corresponds to the procedures described in FIG. 5. In other words, the example is under the assumption that an encrypted communication that propagates encrypted signals from the communication device 10a to the communication device 10b is disrupted.

The communication device 10b detects the signal disruption. Note that the signal disruption refers to a state in which a level of a received signal (e.g., a reception power of an optical signal) is lower than a specific threshold or a state in which optical signals or pseudo-random numbers are out of synchronization. The communication device 10b reports, to the communication device 10a, a signal disruption detection signal that represents detection of signal disruption. The signal disruption detection signal is delivered through an encrypted communication. In the example of FIG. 2, the signal disruption detection signal is delivered from the transmitter 11b to the receiver 12a. Note that when the communication device 10b detects signal disruption, the communication device 10b starts a pseudo-random number synchronization sequence.

Upon receiving the signal disruption detection signal, the communication device 10a detects that an encrypted communication that propagates encrypted signals from the communication device 10a to the communication device 10b is disrupted. The communication device 10a then starts a pseudo-random number synchronization sequence.

In this manner, upon detecting signal disruption, the communication devices 10a and 10b start the pseudo-random number synchronization sequence. More specifically, the communication devices 10a and 10b select a restoring time that represents a time at which an encrypted communication is resumed, obtain a reset count value k that corresponds to the selected restoring time, and reset the counters 14 and 17.

The communication device 10a transmits a known pattern X to the communication device 10b. As described above, the known pattern X includes a training pattern and an encryption start notice pattern. The communication device 10b establishes signal synchronization by using the training pattern and finds out a timing to start an encrypted communication based on the encryption start notice pattern.

The communication device 10a transmits an encrypted known pattern Y to the communication device 10b. A timing to start the known pattern Y (i.e., a timing to start an encrypted communication) has been reported from the communication device 10a to the communication device 10b by means of the encryption start notice pattern. Therefore the communication device 10b can decrypt the known pattern Y.

When the known pattern Y is successfully decrypted, the communication device 10b reports a synchronization OK signal to the communication device 10a. The synchronization OK signal is delivered through an encrypted communication. In the example of FIG. 2, the synchronization OK signal is delivered from the transmitter 11b to the receiver 12a. The communication device 10a that has received the synchronization OK signal starts transmission of encrypted payload. Then an encrypted communication that propagates encrypted signals from the communication device 10a to the communication device 10b is resumed.

Note that when decryption of the known pattern Y failed, the communication device 10b transmits a failure report that represents a failure of decryption of the known pattern Y to the communication device 10a. This failure report is delivered through an encrypted communication. In this case, the communication devices 10a and 10b execute the pseudo-random number synchronization sequence again.

As described above, in the method of encrypted communication according to the present embodiments, when an encrypted communication is disrupted, pseudo-random number synchronization can be established without exchanging a variable for generating pseudo-random numbers (a count value in the case of the preset embodiments) between communication devices. As a result, the security of encrypted communication can be enhanced.

Note that in the sequence in FIG. 6, the communication device 10b transmits a signal disruption report when the communication device 10b detects signal disruption. Then the communication device 10a detects the signal disruption from the signal disruption report. The present embodiments are, however, not limited to this sequence.

FIG. 7 is a sequence diagram illustrating another example of procedures for resuming an encrypted communication. In the sequence in FIG. 7, when the communication device 10b detects signal disruption, the communication device 10b stops signal transmission to the communication device 10a. The communication device 10a thereby detects the signal disruption. Note that the operation in which the communication device 10b stops signal transmission to the communication device 10a is an example of processing that the communication device 10b reports, to the communication device 10a, detection of disruption of communications between the communication devices 10a and 10b. In this case, the communication device 10a detects disruption of communications between the communication devices 10a and 10b from this report.

The subsequent procedures are substantially the same in FIG. 6 and FIG. 7. However, in the sequence in FIG. 7, establishment of pseudo-random number synchronization is executed in two directions. At that time, the pseudo-random number synchronization for delivering cipher text signals from the communication device 10a to the communication device 10b is mainly executed by the transmitter 11a and the receiver 12b. The pseudo-random number synchronization for delivering cipher text signals from the communication device 10b to the communication device 10a is mainly executed by the transmitter 11b and the receiver 12a.

Figure 8:
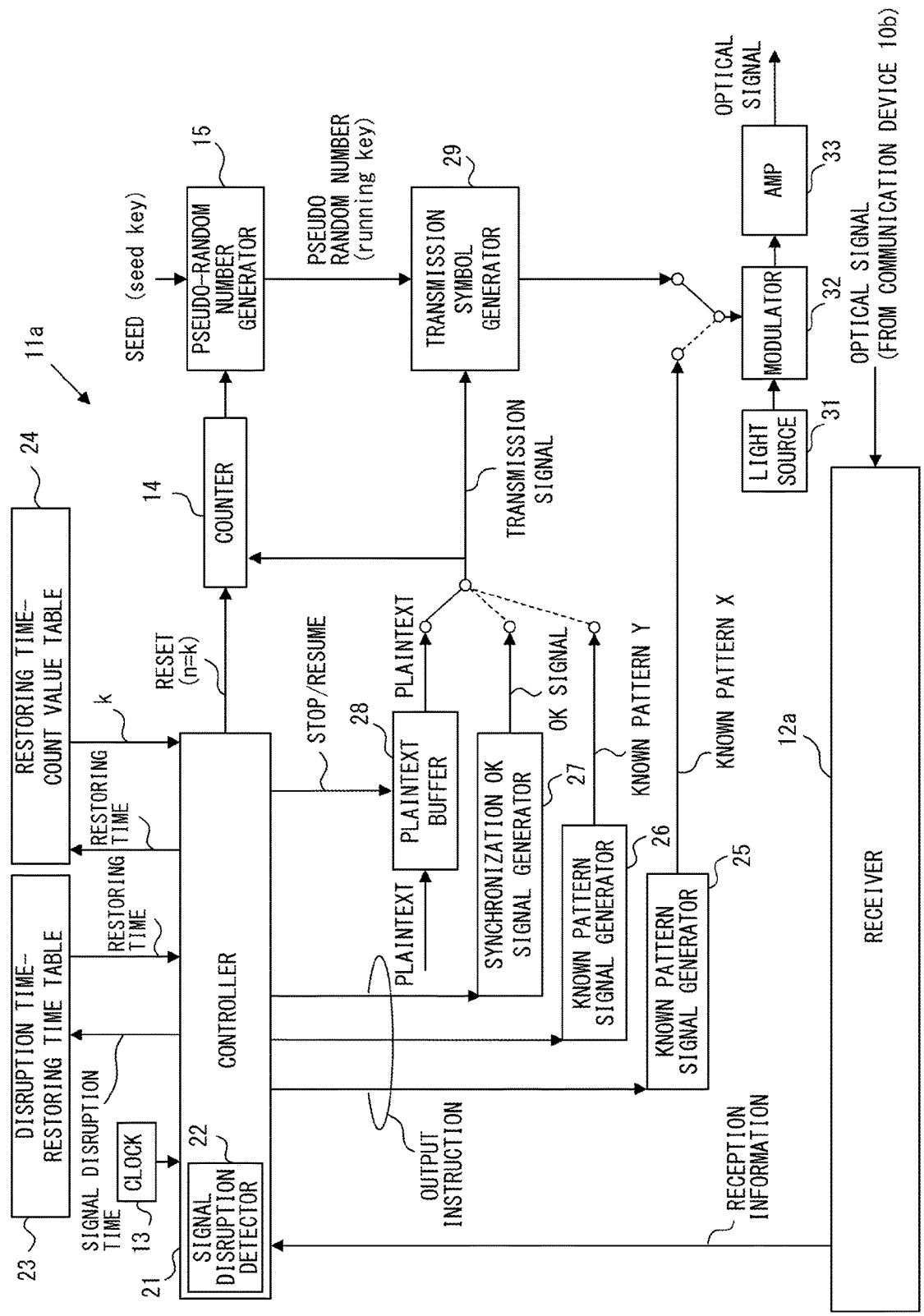
FIG. 8 illustrates an example of a transmitter.

FIG. 8 illustrates an example of the transmitter 11a. Note that a configuration of the transmitter 11a and that of the transmitter 11b are substantially the same.

A controller 21 controls operations of the transmitter 11a. The controller 21 includes a signal disruption detector 22. The signal disruption detector 22 detects disruption of communication between the communication devices 10a and 10b. For example, when the receiver 12a receives a signal disruption report from the communication device 10b, the signal disruption detector 22 detects signal disruption. In addition, when an intensity of optical signals that the receiver 12a receives becomes lower than a specific threshold level, the signal disruption detector 22 detects signal disruption. Note that the receiver 12a reports, to the signal disruption detector 22, reception information that represents a reception state.

When the signal disruption detector 22 detects signal disruption, the controller 21 refers to the clock 13 and finds out the time at which signal disruption is detected (hereinafter referred to as a signal disruption time). The controller 21 refers to a signal disruption time-restoring time table 23 and selects a restoring time that corresponds to the signal disruption time. The signal disruption time-restoring time table 23 records correspondence relations between the signal disruption time and the restoring time as provided in FIG. 3A. Note that the correspondence relations are prepared in advance.

The controller 21 refers to a restoring time-count value table 24 and obtains a reset count value k that corresponds to the selected restoring time. The restoring time-count value table 24 records correspondence relations between the restoring time and the count value used at the time of resuming an encrypted communication (i.e., the reset count value k) as provided in FIG. 3B. Note that the correspondence relations are prepared in advance.

The controller 21 resets the counter 14 to the obtained reset count value k. The counter 14 increments the count value n for every symbol when the transmitter 11a transmits cipher text signals. Note that when the transmitter 11a transmits a known pattern X, a count value n will not be incremented.

The pseudo-random number generator 15 generates pseudo-random numbers (running key) based on a seed (seed key). At that time, the pseudo-random number generator 15 generates pseudo-random numbers that correspond to a count value n of the counter 14.

A known pattern signal generator 25 generates a known pattern X when an output instruction is received from the controller 21. As described above, a known pattern X includes a training pattern and an encryption start notice pattern. Note that when the controller 21 detects signal disruption, after a specific period of time, the controller 21 gives an output instruction to the known pattern signal generator 25.

A known pattern signal generator 26 generates a known pattern Y when an output instruction is received from the controller 21. Note that the controller 21 gives an output instruction to the known pattern signal generator 26 so that a known pattern Y is transmitted following a known pattern X.

An OK signal generator 27 outputs a synchronization OK signal when an output instruction is received from the controller 21. Note that the controller 21 gives an output instruction that indicates generation of a synchronization OK signal when pseudo-random number synchronization is established in the receiver 12a.

A plaintext buffer 28 stores plaintext data to be transmitted to the communication device 10b. The plaintext data may include a known pattern. The plaintext buffer 28 stops output of the plaintext data when a stop instruction is received from the controller 21. In addition, the plaintext buffer 28 resumes output of the plaintext data when a resuming instruction is received from the controller 21.

Note that when the controller 21 detects signal disruption, the controller 21 gives a stop instruction to the plaintext buffer 28. When the controller 21 receives a synchronization OK signal from the communication device 10b, the controller 21 gives a resuming instruction to the plaintext buffer 28.

A transmission symbol generator 29 generates a symbol sequence that represents transmission signals. The transmission signals are plaintext data that corresponds to payload data, a synchronization OK signal, or a known pattern Y. Each symbol that represents transmission signals is encrypted by corresponding pseudo-random numbers. The transmission symbol generator 29 includes, for example, a mapper that generates electric field information that represents a bit sequence of transmission signals. In this case, for example, the electric field information that represents each symbol of transmission signals is corrected in accordance with pseudo-random numbers. Accordingly, symbols output from the transmission symbol generator 29 are influenced by pseudo-random numbers. That is to say, the transmission symbols are encrypted according to the pseudo-random numbers.

Alight source 31 generates continuous wave light with a specific wavelength. A modulator 32 modulates the continuous wave light with output signals from the known pattern signal generator 25 or the transmission symbol generator 29 and generates an optical signal. When output signals from the known pattern signal generator 25 are selected, the modulator 32 generates an optical signal that represents a known pattern X. On the other hand, when output signals from the transmission symbol generator 29 are selected, the modulator 32 generates an optical signal that represents encrypted transmission symbols. The optical signal generated by the modulator 32 is amplified by an optical amplifier 33 and is transmitted to the communication device 10b.

Figure 9:
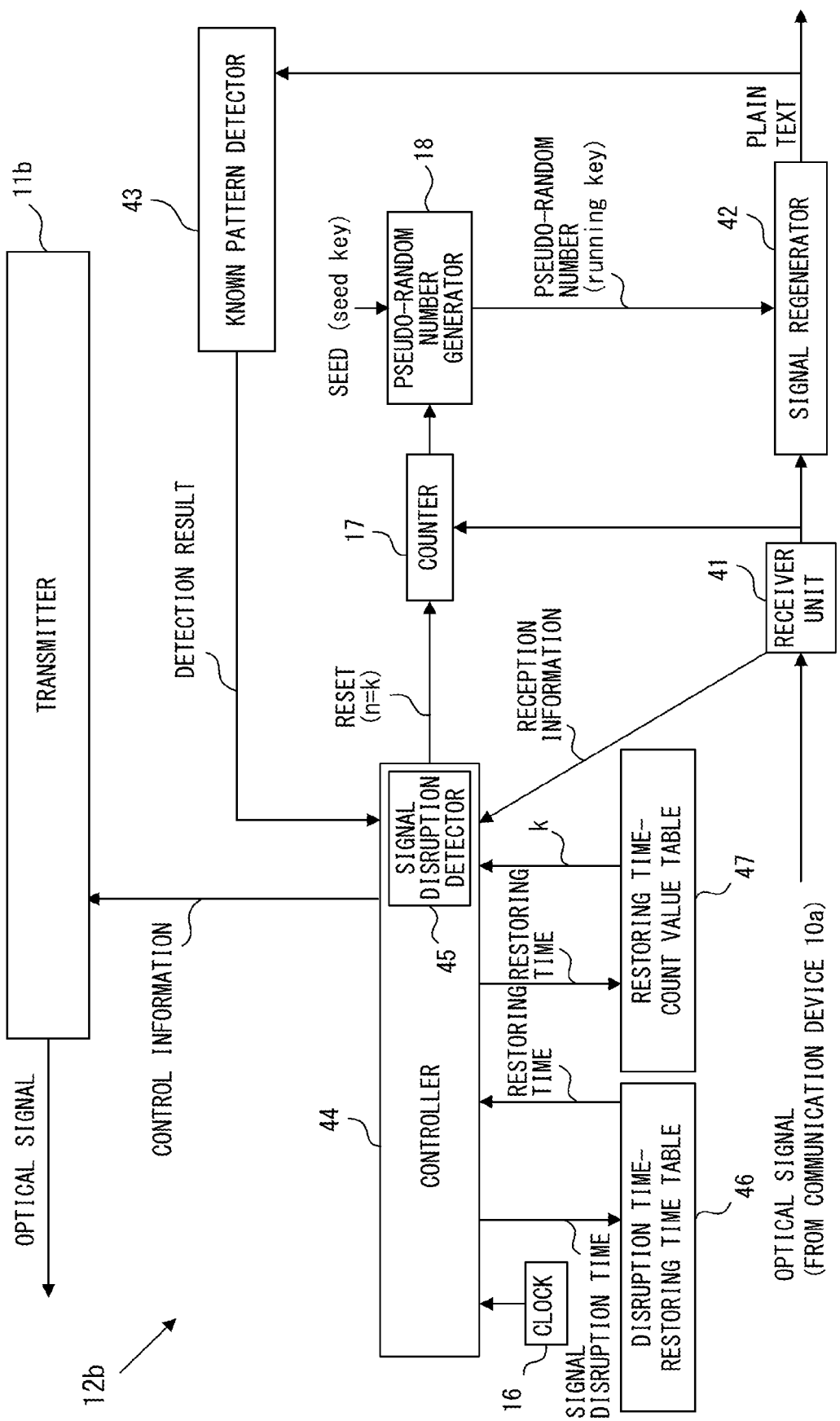
FIG. 9 illustrates an example of a receiver.

FIG. 9 illustrates an example of the receiver 12b. Note that the configuration of the receiver 12a and that of the receiver 12b are substantially the same.

A receiver unit 41 receives an optical signal transmitted from the communication device 10a. The receiver unit 41 includes a coherent receiver as an example. The receiver unit 41 regenerates a symbol sequence from the optical signals. A signal regenerator 42 regenerates signals based on each symbol output from the receiver unit 41. Note that when a cipher text signal is delivered by an optical signal, the signal regenerator 42 decrypts the cipher text signal by using pseudo-random numbers generated by the pseudo-random number generator 18 and regenerates plaintext data.

A known pattern detector 43 detects a known pattern X and a known pattern Y from output signals of the signal regenerator 42. A detection result of the known pattern detector 43 is reported to a controller 44.

The controller 44 controls operations of the receiver 12b. The controller 44 includes a signal disruption detector 45. The signal disruption detector 45 detects disruption of communication between the communication devices 10a and 10b based on reception information generated by the receiver unit 41. The reception information is given to the controller 44 when pseudo-random numbers are out of synchronization. When an intensity of an optical signal that the receiver unit 41 receives becomes lower than a specific threshold level, the reception information is also given to the controller 44.

When the signal disruption detector 45 detects signal disruption, the controller 44 refers to the clock 16 and finds out the time at which signal disruption is detected (hereinafter referred to as a signal disruption time). At that time, the controller 44 can transmit a signal disruption report to the communication device 10a by using the transmitter 11b. The controller 44 also refers to a signal disruption time-restoring time table 46 and selects a restoring time that corresponds to the signal disruption time. Note that the signal disruption time-restoring time table 23 installed in the transmitter 11a and the signal disruption time-restoring time table 46 installed in the receiver 12b are substantially the same.

The controller 44 refers to a restoring time-count value table 47 and obtains a reset count value k that corresponds to the selected restoring time. Note that the restoring time-count value table 24 installed in the transmitter 11a and the restoring time-count value table 47 installed in the receiver 12b are substantially the same.

The controller 44 resets the counter 17 to the obtained reset count value k. The counter 17 increments a count value n for every symbol when the receiver 12b receives cipher text signals. Note that when the receiver 12b receives a known pattern X, a count value n will not be incremented.

When a known pattern X is detected by the known pattern detector 43, the controller 44 obtains an encryption start notice pattern in the known pattern X. The controller 44 also finds out a timing to resume an encrypted communication based on the encryption start notice pattern. Here, during encrypted communications, the counter 17 needs to count up. The controller 44 therefore controls the counter 17 so that the counter 17 resumes the count-up at a timing at which an encrypted communication is resumed.

When a known pattern Y is detected by the known pattern detector 43, the controller 44 determines pseudo-random number synchronization to be established between the transmitter 11a and the receiver 12b. In this case, the controller 44 transmits a synchronization OK signal to the communication device 10a by using the transmitter 11b.

The pseudo-random number generator 18 generates pseudo-random number (running key) based on a seed (seed key). At that time, the pseudo-random number generator 18 generates pseudo-random numbers that correspond to a count value n of the counter 17. With the pseudo-random numbers generated by the pseudo-random number generator 18, the signal regenerator 42 decrypts cipher text signals and regenerates plaintext data.

As described above, when an encrypted communication is disrupted, pseudo-random number synchronization can be established between the transmitter 11a and the receiver 12b without exchanging variables relating to generation of pseudo-random numbers (in this embodiment, a seed and a count value n). In this manner, an encrypted communication can be resumed while the security of the encrypted communication is ensured. In addition, the security of encrypted communications is further enhanced since pseudo-random numbers are generated from a count value that has not been used in the past in resuming an encrypted communication.

Note that in FIG. 8 and FIG. 9, each of the controllers 21 and 44 may be implemented by a processor system as an example. Such a processor system includes a memory and a processor. The processor provides a function relating to encrypted communications (including a function to establish pseudo-random number synchronization) by executing a program stored in the memory.

The signal disruption time-restoring time tables 23 and 46 and the restoring time-count value tables 24 and 47 are generated on the memory, for example. These tables may be implemented by operation algorithms executed by the controllers 21 and 44.

<Physical Layer Encryption>

FIG. 10A and FIG. 10B illustrate an example of a transmitter and an example of a receiver, respectively, both of which perform physical layer encryption. In the present embodiments, physical layer encryption is accomplished by adding noise to optical signals.

The transmitter 100 includes a noise generator 101, a noise adder 102, a digital-to-analog converter (DAC) 103, a light source 104, and a modulator 105, as illustrated in FIG. 10A. The noise generator 101 generates noise based on an encryption key. In the following description, noise generated by the noise generator 101 for physical layer encryption may be referred to as "cryptic noise". The noise adder 102 adds cryptic noise to a data signal. The DAC 103 converts an output signal of the noise adder 102 into an analog signal. The light source 104 generates continuous wave light with a specific wavelength. The modulator 105 generates an optical signal by modulating the continuous wave light with the output signal of the DAC 103.

This example is under the assumption that the transmitter 100 generates optical signals by phase modulation. An optical signal that is not encrypted (i.e., an optical signal to which cryptic noise is not added) is represented by the following formula (1).

$$E_0(t)=E_1 \exp\{j(\omega t+\phi_{DATA}+\phi_{LW})\} \quad (1)$$

$\omega$ represents an angular frequency of carrier waves. $\phi_{DATA}$ represents a phase of a data signal. $\phi_{LW}$ represents a laser phase noise.

An encrypted optical signal (i.e., an optical signal to which cryptic noise is added) is represented by the following formula (2).

$$E_{encrypted}(t)=E_1 \exp\{j(\omega t+\phi_{DATA}+\phi_{noise}+\phi_{LW})\} \quad (2)$$

$\phi_{noise}$ represents cryptic noise to be added to a data signal by the noise adder 102.

The receiver 200 includes a noise removing signal generator 201, a local light source 202, an optical front-end 203, an analog-to-digital converter (ADC) 204, a noise remover 205, a phase synchronizer 206, and a data decision unit 207, as illustrated in FIG. 10B. The noise removing signal generator 201 generates a noise removing signal based on an encryption key. The encryption key given to the noise generator 101 and the encryption key given to the noise removing signal generator 201 are the same each other. The local light source 202 generates local light. The wavelength of the continuous wave light generated by the light source 104 is almost the same as the wavelength of the local light generated by the local light source 202. The optical front-end 203 generates an electric field information signal that indicates a received optical signal by coherent detection. The ADC 204 converts the output signal of the optical front-end 203 into a digital signal.

The noise remover 205 removes cryptic noise from the received signal by using the noise removing signal. The phase synchronizer 206 removes a frequency offset between the light source 104 and the local light source 202. The data decision unit 207 regenerates data from the output signal of the phase synchronizer 206.

Here, the received signal obtained by the optical front-end 203 is represented by the following formula (3).

$$E_{re\text{-}encrypted}(t)=E_1 \exp\{j(\omega t+\Delta wt+\phi_{DATA}+\phi_{noise}+\phi_{LW})\} \quad (3)$$

$\Delta\omega t$ represents a frequency offset between the light source 104 and the local light source 202.

The noise remover 205 removes cryptic noise from the received signal by using the noise removing signal. Thus the output signal of the noise remover 205 is represented by the following formula (4).

$$E_{decrypted}(t)=E_1 \exp\{j(\omega t+\Delta wt+\phi_{DATA}+\phi_{LW})\} \quad (4)$$

Here, a frequency offset is removed by the phase synchronizer 206 as described above. The data decision unit 207 detects the phase of received symbol based on $\phi_{DATA}$ and regenerates data.

In the transmitter 100 with the above-described configuration, the noise generator 101 generates a phase noise based on an encryption key in the present embodiments. Here, each symbol is encrypted with a 4-bit encryption key. In this case, the noise generator 101 converts the encryption key into a phase in accordance with the mapping rules in FIG. 11 as an example. Note that an encryption key assigned to each symbol is determined in accordance with a specific algorithm. In the embodiment in FIG. 11, encryption keys "1001", "0011", "1110", and "0001" are generated for symbols a, b, c, and d, respectively. In this case, the noise generator 101 generates cryptic noise "−22.5", "112.5", "−135", and "157.5" for symbols a, b, c, and d, respectively.

Figure 12:
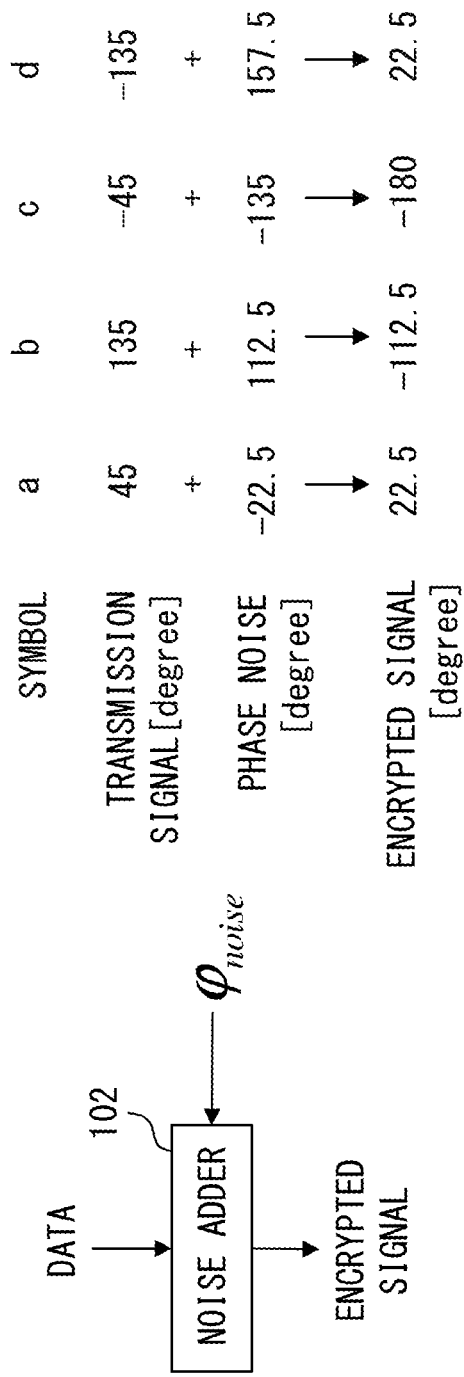
FIG. 12 illustrates an example of encryption of transmission signals.

The noise adder 102 adds cryptic noise generated by the noise generator 101 to a data signal. More specifically, the noise adder 102 generates an encrypted signal by adding cryptic noise to a phase of each symbol. For example, as illustrated in FIG. 12, symbols a, b, c, and d are mapped to "45", "135", "−45", and "135", respectively. In this case, the encrypted symbols a, b, c, and d are represented by "22.5", −112.5", "−180", and "22.5", respectively.

Figure 13A:
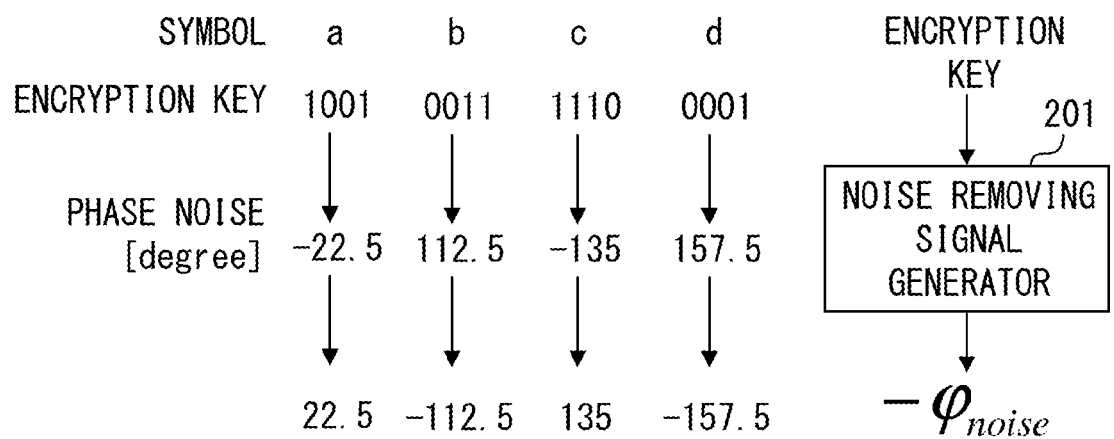
FIG. 13A and FIG. 13B illustrate an example of decryption of transmission signals.

Meanwhile, in the receiver 200, the noise removing signal generator 201 generates a noise removing signal for removing cryptic noise. The noise removing signal generator 201 generates a phase noise for each symbol by means of the same method as the method used in the noise generator 101. By inverting a sign of the generated phase noise, the noise removing signal generator 201 generates the noise removing signal. Here, the encryption key given to the noise generator 101 and the encryption key given to the noise removing signal generator 201 are the same. In this manner, the noise removing signal that cancels out the cryptic noise added in the transmitter 100 are generated. In the example of FIG. 13A, for example, an encryption key "1001" is assigned to a symbol a, and a phase noise "−22.5" is generated. In this case, a noise removing signal "22.5" is generated for the symbol a.

Figure 13B:
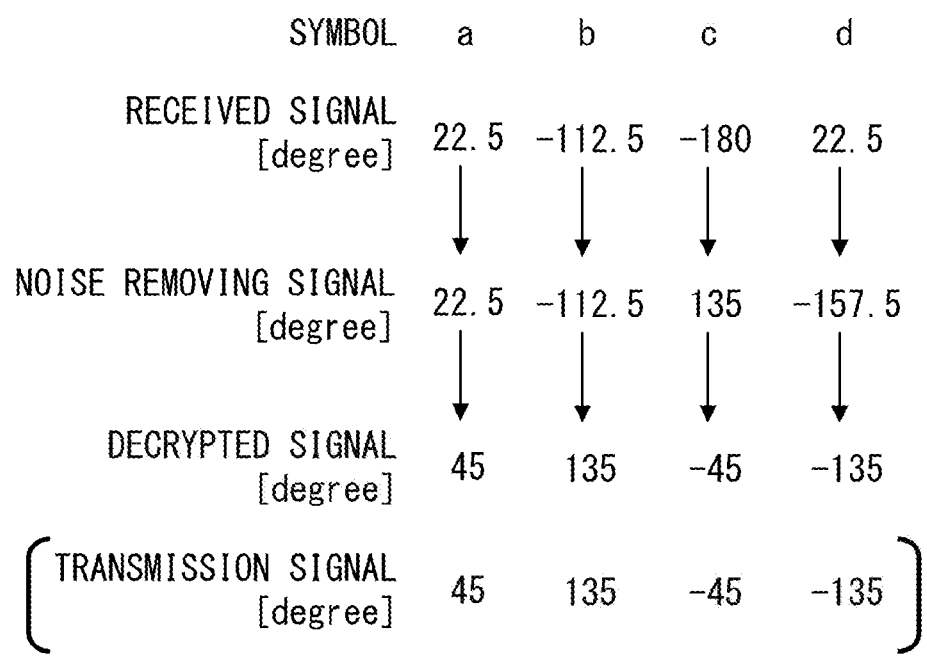

As illustrated in FIG. 13B, the noise remover 205 removes the cryptic noise added in the transmitter 100 by adding the noise removing signal to the received signal before phase synchronization. As a result, a signal that is the same as the transmission signal in FIG. 12 can be obtained. Note that the received signal in FIG. 13B correspond to the encrypted signal in FIG. 12. Here, layer phase noises, frequency offsets, noises in the optical amplifier, nonlinear noises, and others are ignored for the sake to keep the description as simple as possible.

As described above, in the physical layer encryption, cryptic noise generated according to a common key is added to a physical signal (an optical signal in the example of FIG. 10A and FIG. 10B). Accordingly, even if a wiretapper obtains optical signals on a transmission channel, it would be difficult to regenerate data from the optical signals.

However, devices (e.g., a modulator, a driver, etc.), implemented in a transmitter and/or a receiver, have variation in characteristics. For that reason, in conventional physical layer encryptions, cryptic noise added in a transmitter may not be removed sufficiently but may remain in a receiver. This may cause quality deterioration of data signals. In addition, this may cause a biased distribution of constellation points in a constellation diagram of signals to which cryptic noise is added. In such a case, the encryption may become easily decrypted.

First Embodiment

Figure 14:
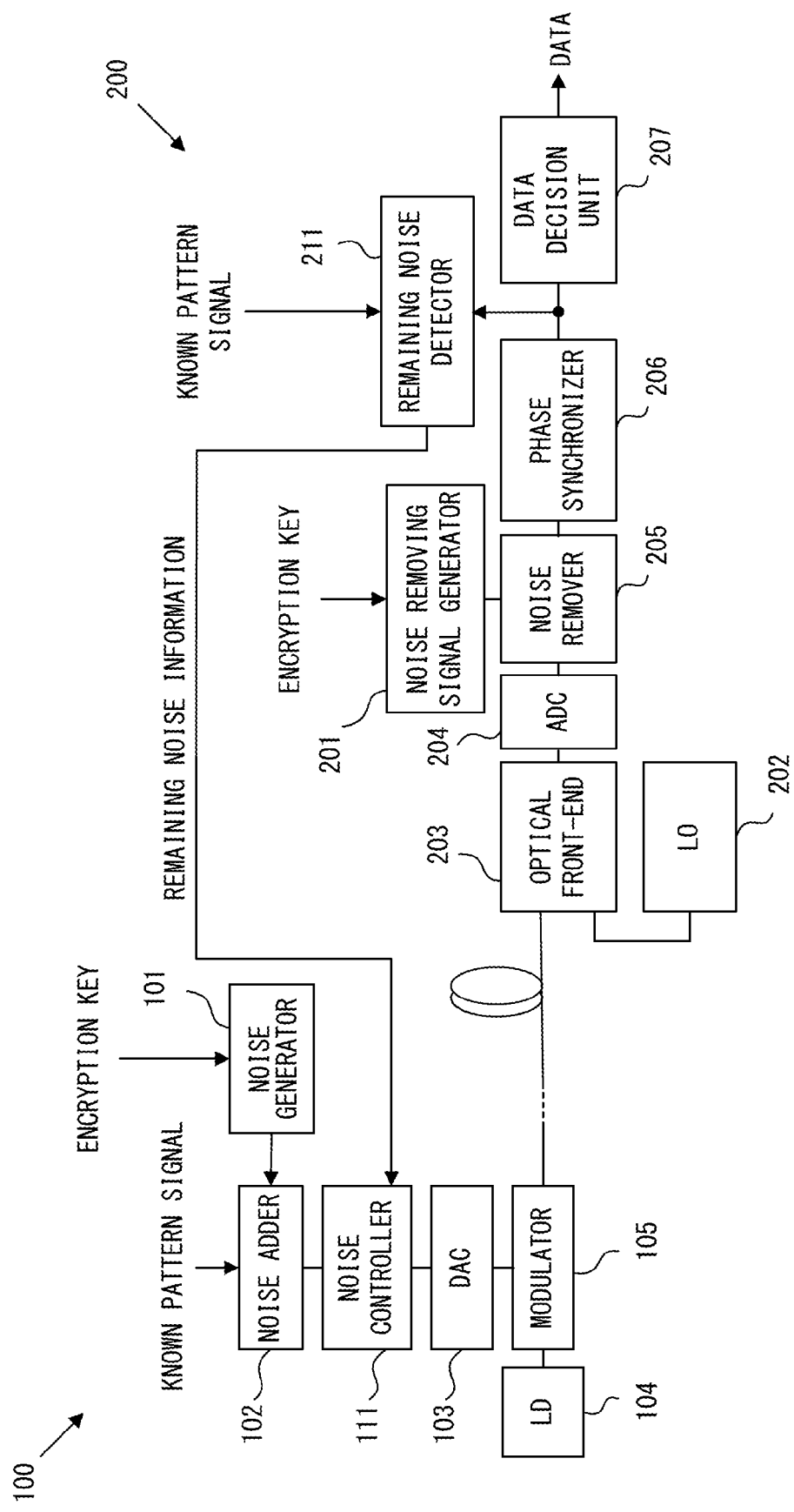
FIG. 14 illustrates an example of a communication system according to the first embodiment.

FIG. 14 illustrates an example of a communication system according to the first embodiment. The communication system according to the first embodiment includes a transmitter 100 and a receiver 200.

The transmitter 100 includes a noise generator 101, a noise adder 102, a DAC 103, a light source 104, a modulator 105, and a noise controller 111. The noise generator 101, the noise adder 102, the DAC 103, the light source 104, and the modulator 105 are substantially the same each other in FIG. 10A and FIG. 14. The noise controller 111 is provided between the noise generator 101 and the noise adder 102 and corrects cryptic noise based on remaining noise information reported from the receiver 200. More specifically, the noise controller 111 corrects a phase and/or an amplitude of a signal to which cryptic noise is added according to the remaining noise information.

The receiver 200 includes a noise removing signal generator 201, a local light source (LO) 202, an optical front-end 203, an ADC 204, a noise remover 205, a phase synchronizer 206, a data decision unit 207, and a remaining noise detector 211. The noise removing signal generator 201, the local light source 202, the optical front-end 203, the ADC 204, the noise remover 205, the phase synchronizer 206, and the data decision unit 207 are substantially the same each other in FIG. 10B and FIG. 14. The remaining noise detector 211 detects a remaining cryptic noise, which has not been removed in the noise remover 205, based on the output signals of the phase synchronizer 206. The remaining noise information that represents the detected remaining noise is reported to the transmitter 100. The remaining noise information is delivered to the transmitter 100 through a control channel for delivering control signals as an example. Alternatively, the remaining noise information may be multiplexed into a data channel for delivering data from a node including the receiver 200 to a node including the transmitter 100. In this case, the remaining noise information is multiplexed into the data channel by frequency modulation as an example. Moreover, the renaming noise information may be reported via a network management system that is not illustrated.

In the communication system with the above-described configuration, the noise controller 111 is adjusted, for example, before data communications. According to the sequence to adjust the noise controller 111, in the transmitter 100, a known pattern signal is input to the noise adder 102 and in the receiver 200, and a known pattern signal is also input to the remaining noise detector 211. The known pattern signal input to the noise adder 102 and the known pattern signal input to the remaining noise detector 211 are the same.

Figure 15:
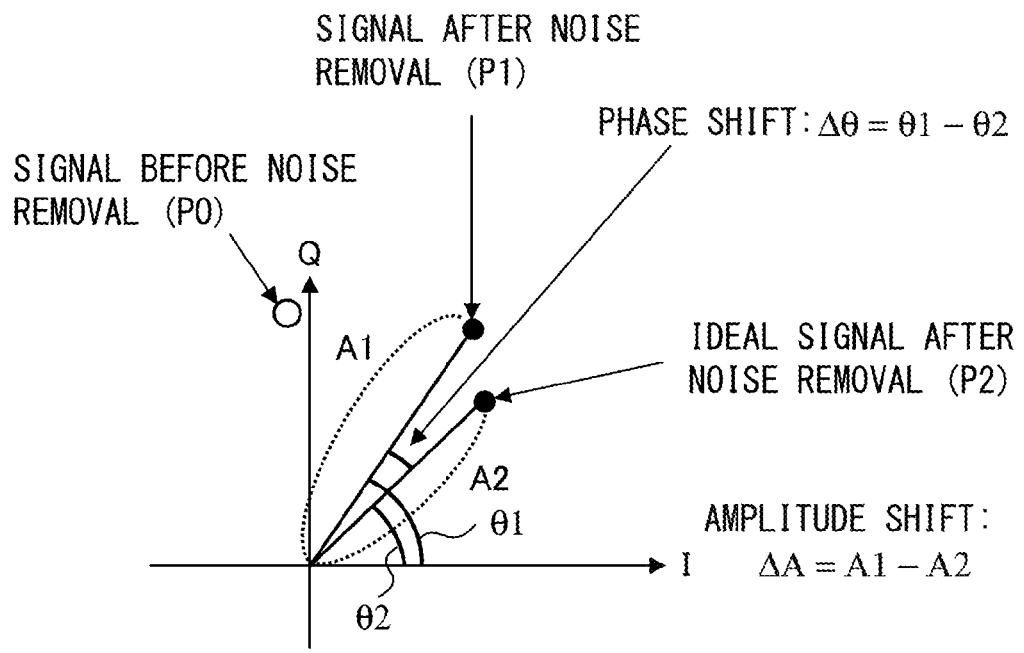
FIG. 15 illustrates an example of a method of detecting remaining noise.

FIG. 15 illustrates an example of a method of detecting a remaining noise. In this example, the phase and the amplitude of a known pattern signal are "θ2" and "A2", respectively. P0 represents a constellation point of a signal before cryptic noise is removed. P1 represents a constellation point of a signal after cryptic noise is removed. The remaining noise detector 211 detects the phase and the amplitude of a signal after cryptic noise is removed. In this example, the phase and the amplitude of P1 (i.e., a signal after cryptic noise is removed) are "θ1" and "A1", respectively. P2 represents a constellation point of a known pattern signal. The known pattern signal P2 corresponds to an ideal signal after cryptic noise is removed.

In this case, when the cryptic noise added in the transmitter 100 is completely removed in the noise remover 205, P1 matches P2. In other words, the difference between P1 and P2 corresponds to a remaining noise that was not removed by the noise remover 205 and remains in the signal. The remaining noise detector 211 detects a remaining noise by calculating a difference between P1 and P2. More specifically, a phase shift $\Delta\theta(=\theta1-\theta2)$ and an amplitude shift $\Delta A(=A1-A2)$ are detected.

Note that a remaining noise is detected from each signal to which cryptic noise is added. For example, in a case in which a modulation scheme is QPSK and symbols are generated according to 4-bit encryption key, 16 sets of remaining noises are detected.

Figure 16:
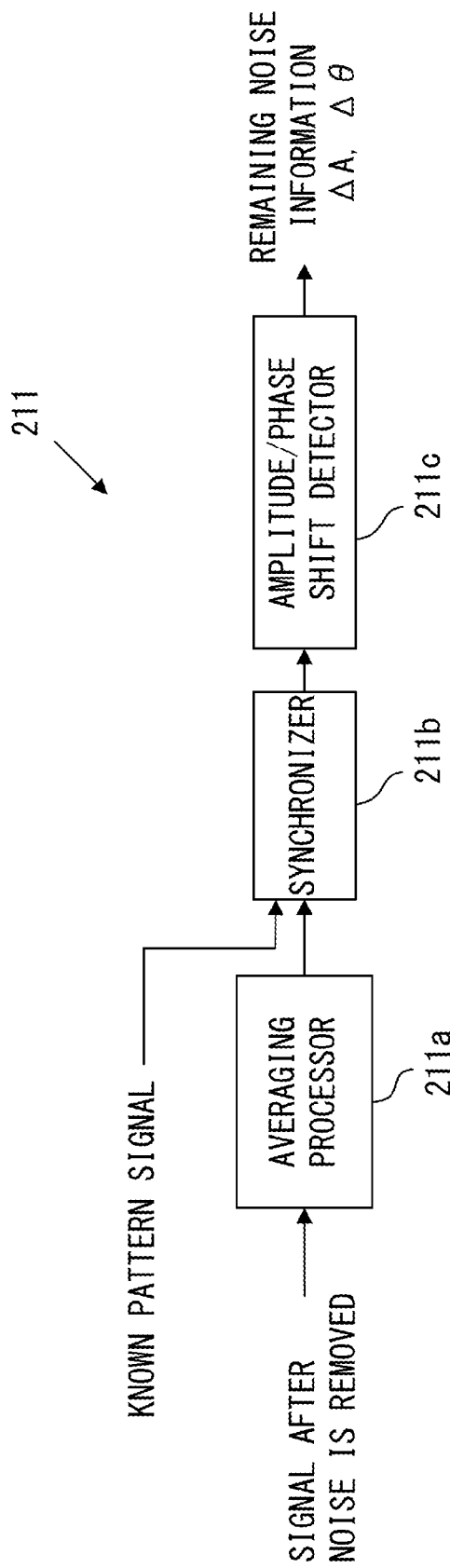
FIG. 16 illustrates an example of a remaining noise detector.

FIG. 16 illustrates an example of the remaining noise detector 211. In this embodiment, the remaining noise detector 211 includes an averaging processor 211*a*, a synchronizer 211*b*, and an amplitude/phase shift detector 21*c*.

The averaging processor 211*a* calculates an average of phases and amplitudes of symbols in the output signals of the phase synchronizer 206 (i.e., received signals from which cryptic noise is removed). As a result of this averaging, noises other than cryptic noise are removed. Note that a plurality of known pattern signals may be used in the averaging process. The synchronizer 211*b* adjusts a timing of at least one of the output signals of the averaging processor 211*a* and the known patter signal so as to make a timing of the output signals of the averaging processor 211*a* coincide with a timing of the known patter signal. The amplitude/phase shift detector 211*c* detects a phase shift and an amplitude shift in each symbol and generates remaining noise information.

The above-described remaining noise information is reported from the receiver 200 to the transmitter 100. Based on the remaining noise information, the noise controller 111 corrects the phase and the amplitude of a signal to which cryptic noise is added. For example, when the remaining noise detected by the remaining noise detector 211 is Δθ and ΔA, the noise controller 111 subtracts "Δθ" and "ΔA" from the phase and the amplitude of an output signal of the noise adder 102 (i.e., signals to which cryptic noise is added).

FIG. 17 is a flowchart illustrating an example of encrypted communications according to the first embodiment. The processing in this flowchart is executed, for example, before data communications are started between the transmitter 100 and the receiver 200.

In S1, the transmitter 100 encrypts a known pattern signal and transmits the encrypted signal to the receiver 200. Note that the known pattern signal is encrypted as a result of cryptic noise being added.

In S2, the noise removing signal generator 201 generates a noise removing signal and removes the cryptic noise from the received signal by using the noise removing signal. The phase synchronizer 206 removes a frequency offset from the received signal from which the cryptic noise is removed.

In S3, the remaining noise detector 211 removes noises other than cryptic noise from the received signal by the averaging process. In S4, the remaining noise detector 211 establishes a synchronization between the received signal and the known pattern signal. In S5, the remaining noise detector 211 calculates a difference between the received signal and the known pattern signal. In other words, remaining noise information that represents a phase shift and an amplitude shift is generated. In S6, the receiver 200 reports the remaining noise information to the transmitter 100.

In S7, the noise controller 111 corrects the cryptic noise based on the remaining noise information. More specifically, the noise controller 111 corrects the phase and the amplitude of a signal to which cryptic noise is added according to the remaining noise information so as to reduce the remaining noises (preferably to zero) in the receiver 200.

Note that although remaining noise is detected in the receiver 200 in the example of FIG. 14, the first embodiment is not limited to this configuration. For example, the first embodiment may have such a configuration that the output signal of the phase synchronizer 206 is reported to the transmitter 100 and the output signal of the phase synchronizer 206 and the known pattern signal are compared in the transmitter 100 to detect the remaining noise.

As described above, in the method of encrypted communications according to the first embodiment, remaining noise is detected in the receiver 200 and cryptic noise is corrected so as to cancel out the remaining noise. Then encryption is performed by using the corrected cryptic noise. This results in accurate removal of cryptic noise in the receiver 200 and improved quality of a data signal. In addition, the distribution in a constellation diagram for signals to which cryptic noise is added becomes less biased, making the decryption more difficult.

Second Embodiment

In the first embodiment, remaining noise is detected in the receiver 200 and the transmitter 100 corrects cryptic noise based on remaining noise information reported from the receiver 200. In the second embodiment, cryptic noise correction is performed in a communication device that includes a transmitter and a receiver.

Figure 18:
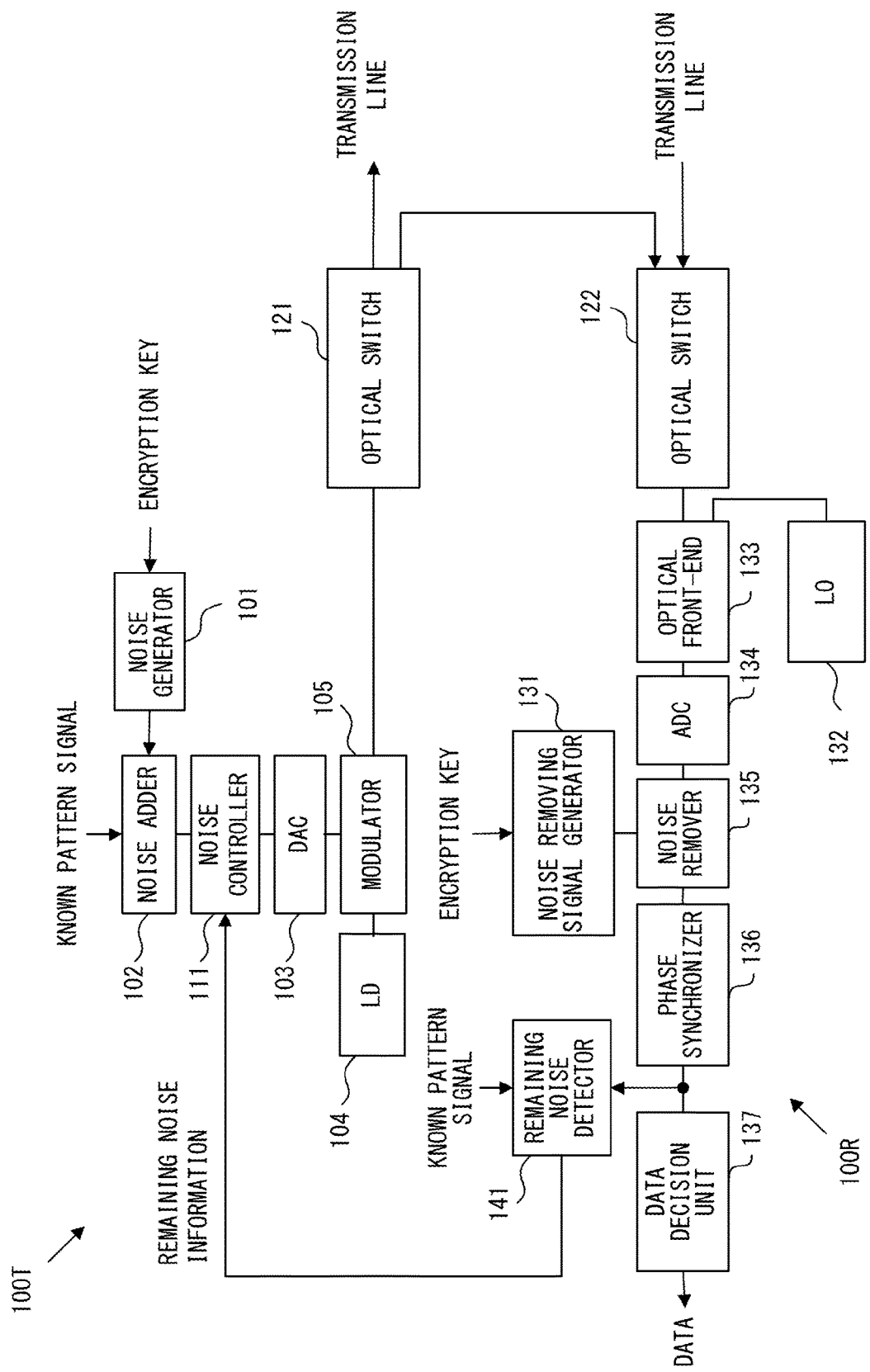
FIG. 18 illustrates an example of a communication device according to the second embodiment.

FIG. 18 illustrates an example of a communication device according to the second embodiment. The communication device includes a transmitter 100T and a receiver 100R. Note that the transmitter 100T is the same as the transmitter 100 in FIG. 14. The receiver 100R is substantially the same as the receiver 200 in FIG. 14. In other words, a noise removing signal generator 131, a local light source 132, an optical front-end 133, an ADC 134, a noise remover 135, a phase synchronizer 136, a data decision unit 137, a remaining noise detector 141, which are installed in the receiver 100R, respectively correspond to the noise removing signal generator 201, the local light source 202, the optical front-end 203, the ADC 204, the noise remover 205, the phase synchronizer 206, the data decision unit 207, and the remaining noise detector 211, which are installed in the receiver 200 in FIG. 14.

An optical switch 121 guides an optical signal generated by the transmitter 100T to a transmission line or the receiver 100R. An optical switch 122 selects an optical signal guided from the transmitter 100T or an optical signal received through the transmission line. In a control sequence to correct cryptic noise, the optical switches 121 and 122 are controlled so that an optical signal generated by the transmitter 100T is guided to the receiver 100R.

When cryptic noise correction is performed before data communications, the optical switches 121 and 122 are not necessary. In this case, the cryptic noise correction is performed, for example, in a state in which an optical fiber connects between the modulator 105 and the optical front-end 133. Alternatively, the cryptic noise correction may be performed after data communications are started.

Note that one or both of the optical switches 121 and 122 may be replaced with an optical coupler(s) (or may be replaced with an optical splitter(s)). In this case, the cost for optical transceivers can be kept lower than the configuration in FIG. 18.

Third Embodiment

In the first embodiment, remaining noises are detected in the receiver 200 and the transmitter 100 corrects cryptic noise based on remaining noise information reported from the receiver 200. In the third embodiment, remaining noises are detected in the receiver 200 and correction processing is performed also in the receiver 200.

Figure 19:
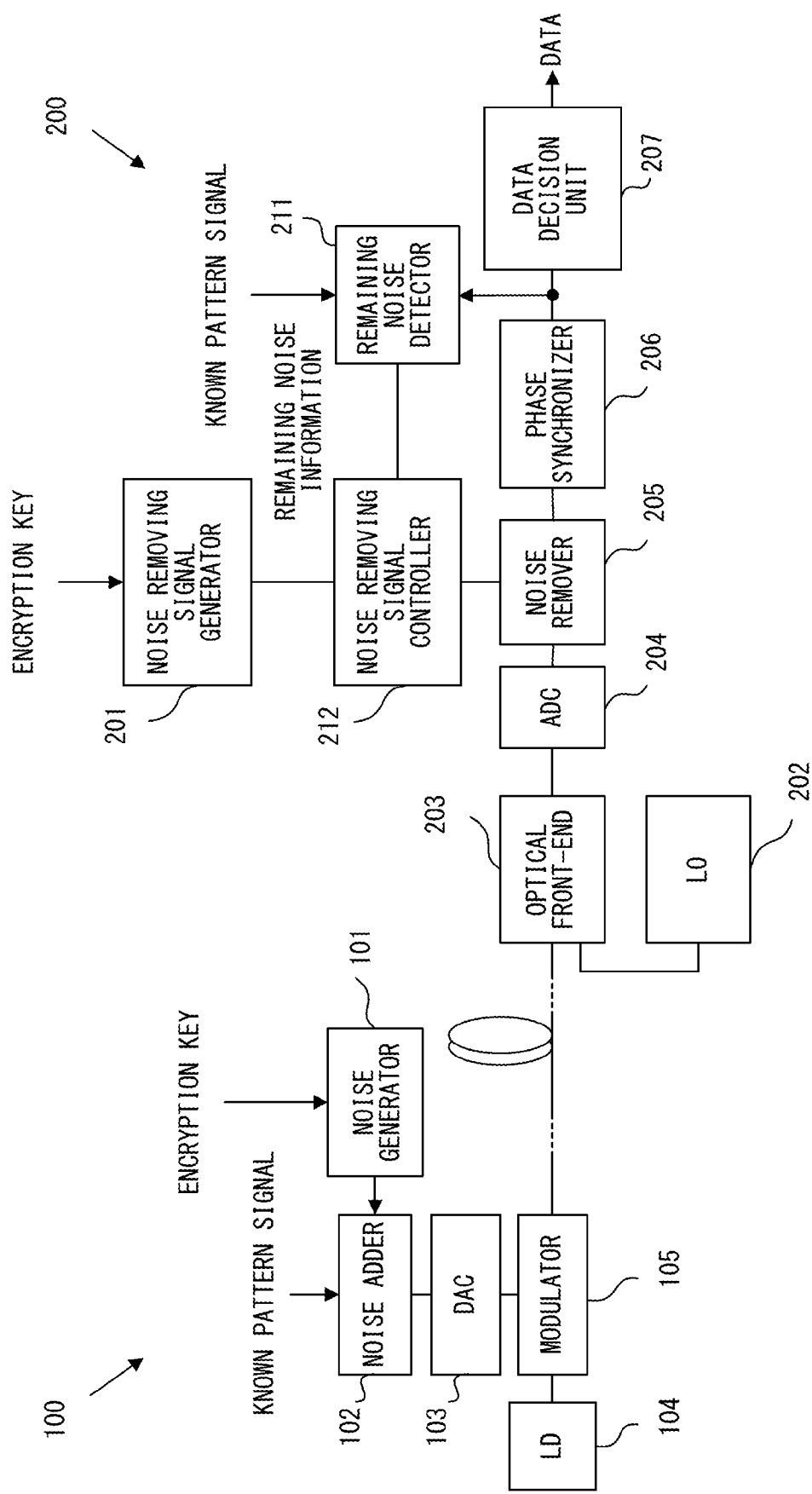
FIG. 19 illustrates an example of a communication system according to the third embodiment.

FIG. 19 illustrates an example of a communication system according to the third embodiment. The communication system according to the third embodiment includes a transmitter 100 and a receiver 200.

The transmitter 100 in FIG. 19 is substantially the same as that in FIG. 10A. In other words, the transmitter 100 adds cryptic noise to a known pattern signal at the time of correcting cryptic noise. The transmitter 100 modulates continuous wave light with the known pattern signal to which cryptic noise is added and generates an optical signal.

The receiver 200 includes a noise removing signal generator 201, a local light source 202, an optical front-end 203, an ADC 204, a noise remover 205, a phase synchronizer 206, a data decision unit 207, a remaining noise detector 211, and a noise removing signal controller 212. The noise removing signal generator 201, the local light source 202, the optical front-end 203, the ADC 204, the noise remover 205, the phase synchronizer 206, and the data decision unit 207 in FIG. 19 are substantially the same as those in FIG. 10B.

The remaining noise detector 211 in the third embodiment is substantially the same as that in the first embodiment. In other words, the remaining noise detector 211 detects remaining cryptic noise, which has not been removed in the noise remover 205, based on the output signal of the phase synchronizer 206.

The noise removing signal controller 212 corrects a noise removing signal generated by the noise removing signal generator 201 based on the remaining noise detected by the remaining noise detector 211. The correction processing performed by the noise removing signal controller 212 corresponds to the correction processing performed by the noise controller 111 in the first embodiment. More specifically, when a phase shift $\Delta\theta$ and an amplitude shift $\Delta A$ are detected by the remaining noise detector 211, the noise removing signal controller 212 subtracts "Δθ" and "ΔA" from the phase and the amplitude, respectively, of the noise removing signals. Alternatively, the noise removing signal controller 212 adds "−Δθ" and "−ΔA" to the phase and the amplitude, respectively, of the noise removing signals.

Like the first embodiment, the third embodiment allows accurate removal of cryptic noise from received signals, resulting in improved quality of data signals.

Fourth Embodiment

In the first and third embodiments, cryptic noise is added to a signal in the transmitter 100 and cryptic noise is removed from the received signal in the receiver 200. In this configuration, a timing of the cryptic noise added to the received signal needs to be made coincide with a timing of the noise removing signal. The fourth embodiment relates to the timing adjustment.

Figure 20:
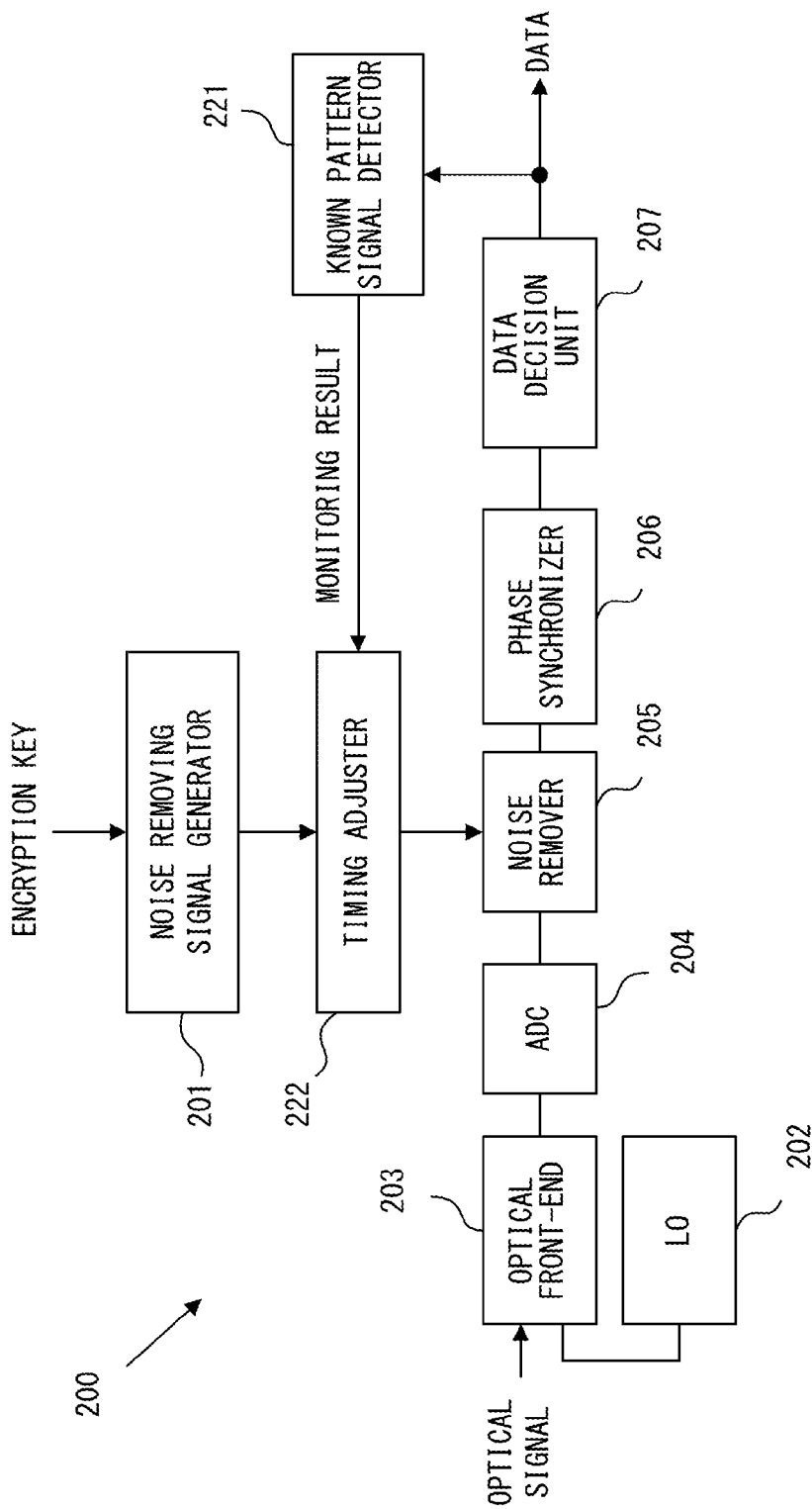
FIG. 20 illustrates an example of a receiver according to the fourth embodiment.

FIG. 20 illustrates an example of a receiver according to the fourth embodiment. The receiver 200 in the fourth embodiment includes a noise removing signal generator 201, a local light source 202, an optical front-end 203, an ADC 204, a noise remover 205, a phase synchronizer 206, a data decision unit 207, a known pattern signal detector 221, and a timing adjuster 222. Note that the receiver 200 includes a remaining noise detector 211, which is not illustrated in FIG. 20.

The known pattern signal detector 221 monitors the output signal of the data decision unit 207 and detects the known pattern signal. The known pattern signal detector 221 outputs monitoring result information that represents whether the known pattern signal is detected or not. The timing adjuster 222 adjusts a timing of the noise removing signal based on the monitoring result information.

FIG. 21 illustrates an example of a method of adjusting a timing of a noise removing signal. In this embodiment, the transmitter 100 transmits a known pattern signal 1 and a known pattern single 2 when an encrypted communication is started or resumed. The known pattern signal 1 is transmitted to the receiver 200 without being encrypted. Alternatively, the known pattern signal 1 may be encrypted with an encryption key that is different from an encryption key for data communications and may be transmitted to the receiver 200. The known pattern signal 1 may represent a time or a timing to start an encrypted communication. In this case, the known pattern signal 1 corresponds to the encryption start notice pattern in FIG. 5.

The known pattern signal 2 is encrypted with an encryption key for data communications and is transmitted to the receiver 200. The known pattern signal 2 is repeatedly transmitted until cryptographic synchronization is established in the receiver 200.

Figure 22:
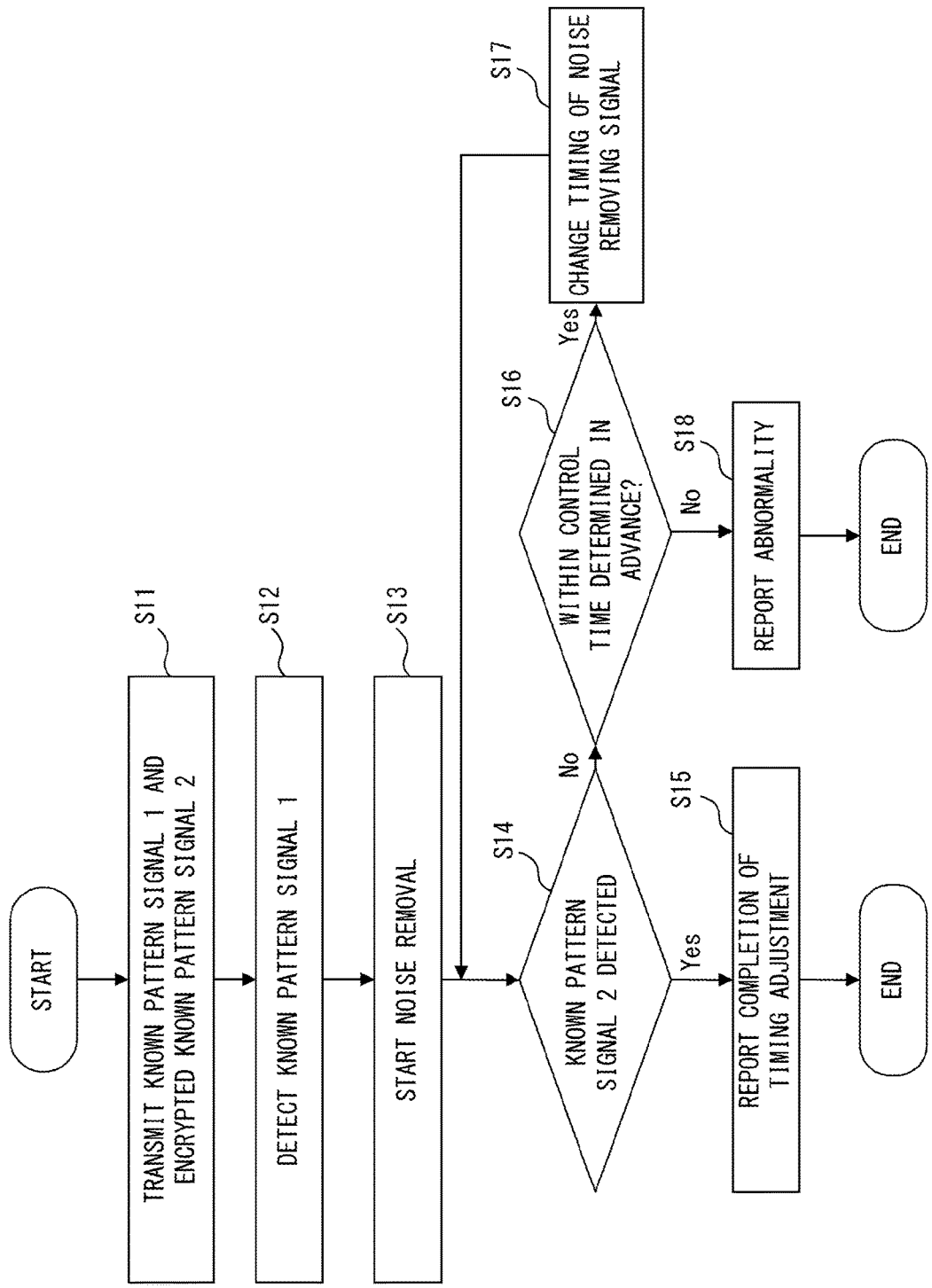
FIG. 22 is a flowchart illustrating a method of adjusting a timing of noise removing signals

FIG. 22 is a flowchart illustrating a method of adjusting a timing of noise removing signals. The processing in this flowchart is executed, for example, when the transmitter 100 and the receiver 200 start or resume an encrypted communication.

In S11, the transmitter 100 transmits a known pattern signal 1 and an encrypted known pattern signal 2 to the receiver 200. In this embodiment, a known pattern signal 1 is transmitted to the receiver 200 without being encrypted. The known pattern signal 2 is repeatedly transmitted as in FIG. 21 until cryptographic synchronization is established in the receiver 200.

In S12, the known pattern signal detector 221 detects the known pattern signal 1. Then the receiver 200 starts noise removal in S13. In other words, the noise removing signal generator 201 starts generating the noise removing signal and the noise remover 205 starts processing to remove cryptic noise from the received signal by using the noise removing signal.

In S14, the known pattern signal detector 221 determines whether or not the known pattern signal 2 can be detected from the received signal from which cryptic noise has been removed. When the known pattern signal 2 is not detected, in S16, the known pattern signal detector 221 determines whether a specific control time has elapsed or not since when the known pattern signal 1 was detected.

When the control time has not been elapsed yet (S16: Yes), in S17, the known pattern signal detector 221 reports, to the timing adjuster 222, a monitoring result representing that the known pattern signal 2 has not been detected. The timing adjuster 222 changes a timing of the noise removing signal generated by the noise removing signal generator 201. Afterwards, the processing in the receiver 200 returns to S14.

In this manner, the transmitter 100 repeatedly transmits the known pattern signal 2. The receiver 200, on the other hand, monitors the known pattern signal 2 while changing a timing of the noise removing signal by repeatedly executing S14 and S17. When the receiver 200 detects the known pattern signal 2, the receiver 200 determines a timing of cryptic noise added to the received signal and a timing of the noise removing signal to be coincide with each other and encryption synchronization to be established.

When the known pattern signal 2 is detected, in S15, the known pattern signal detector 221 transmits, to the transmitter 100, a completion report representing that timing adjustment of the noise removing signal has been completed. When the transmitter 100 receives the completion report, the transmitter 100 stops transmitting the known pattern signal 2 and starts data communications. Note that when the known pattern signal 2 was not detected within the control time, the receiver 200 reports the abnormal state to the transmitter 100 in S18.

Fifth Embodiment

In the recent years, technologies have been studied in which optimal transmission parameters are selected in accordance with conditions of transmission channels or characteristics of optical transceivers etc. For example, an optimal modulation format, an optimal baud rate, an optimal FEC type etc. are selected in accordance with conditions of transmission channels.

Here, a required encryption key bit length depends on transmission parameters. For example, a distance between constellation points is smaller in a constellation diagram of 16QAM than that of QPSK. It is therefore considered to be possible to have a shorter encryption key bit length for 16QAM than an encryption key bit length for QPSK. In the fifth embodiment, an encryption key bit length is changed in accordance with selected transmission parameters.

Figure 23:
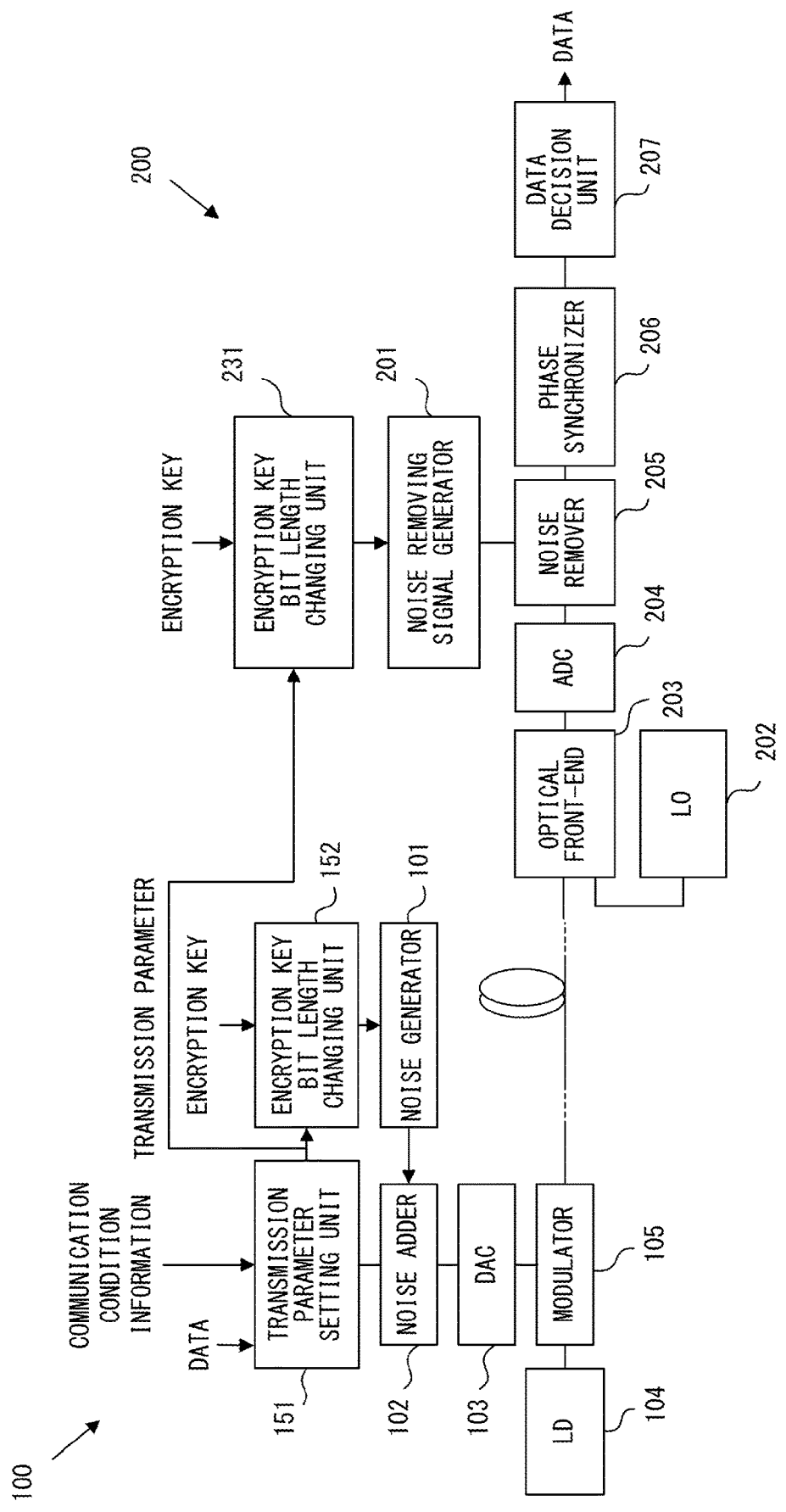
FIG. 23 illustrates an example of a communication system according to the fifth embodiment.

FIG. 23 illustrates an example of a communication system according to the fifth embodiment. Note that in the fifth embodiment, optimal transmission parameters are selected in accordance with conditions of transmission lines or characteristics of optical transceivers etc. Communication condition information that represents the conditions of transmission lines or characteristics of optical transceivers etc. is collected by, for example, a network management system, which is not illustrated.

The transmitter 100 includes a noise generator 101, a noise adder 102, a DAC 103, a light source 104, a modulator 105, a transmission parameter setting unit 151, an encryption key bit length changing unit 152. The transmission parameter setting unit 151 selects transmission parameters based on the communication condition information. For example, the transmission parameter setting unit 151 selects a modulation format based on the communication condition information and configures a mapper based on the selected modulation format. The transmission parameter setting unit 151 reports the selected transmission parameters to the encryption key bit length changing unit 152 and an encryption key bit length changing unit 231, which is described later.

The encryption key bit length changing unit 152 determines an encryption key bit length based on the transmission parameters reported from the transmission parameter setting unit 151. The encryption key bit length changing unit 152 changes the encryption key bit length. For example, when an n-bit encryption key is given to the transmitter 100 and the bit length determined in accordance with transmission parameters is m bits, the encryption key bit length changing unit 152 generates an m-bit encryption key from the n-bit encryption key. Note that the noise generator 101 generates cryptic noise by using the encryption key generated by the encryption key bit length changing unit 152, and the noise adder 102 adds the cryptic noise to data signals.

The receiver 200 includes a noise removing signal generator 201, a local light source 202, an optical front-end 203, an ADC 204, a noise remover 205, a phase synchronizer 206, a data decision unit 207, and an encryption key bit length changing unit 231. The processing in the encryption key bit length changing unit 231 is substantially the same as the processing in the encryption key bit length changing unit 152. In other words, the encryption key bit length changing unit 231 changes an encryption key bit length based on the transmission parameters reported from the transmission parameter setting unit 151. The encryption key generated by the encryption key bit length changing unit 152 and the encryption key generated by the encryption key bit length changing unit 231 are the same. Note that the noise removing signal generator 201 generates a noise removing signal based on the encryption key generated by the encryption key bit length changing unit 231, and the noise remover 205 removes cryptic noise from the received signal by using the noise removing signals.

FIG. 24 is a flowchart illustrating an example of a method of optimizing an encryption key bit length. The processing in this flowchart is executed, for example, before data communications start. The processing in this flowchart may also be dynamically executed during data communications.

In S21, the transmission parameter setting unit 151 selects transmission parameters based on communication condition information. In this example, the transmission parameter setting unit 151 selects a modulation format. In S22, the transmission parameter setting unit 151 reports the selected transmission parameters (in this example, a modulation format) to the encryption key bit length changing units 152 and 231. The transmission parameters may be reported by using a control channel or by being multiplexed into a data channel. In addition, the transmission parameters may be reported via a network management system, which is not illustrated. In S23, the encryption key bit length changing units 152 and 231 respectively changes an encryption key bit length in accordance with the reported transmission parameters.

Sixth Embodiment

In the example of FIG. 11 to FIG. 13B, physical layer encryption can be accomplished by adding a phase noise to a transmission signal. The sixth embodiment, on the other hand, realizes physical layer encryption by adding an amplitude noise to a transmission signal as in FIG. 25. In this case, the noise generator 101 generates amplitude noises in response to given encryption keys. The noise removing signal generator 201 generates a noise removing signal in response to given encryption keys.

Figure 25:
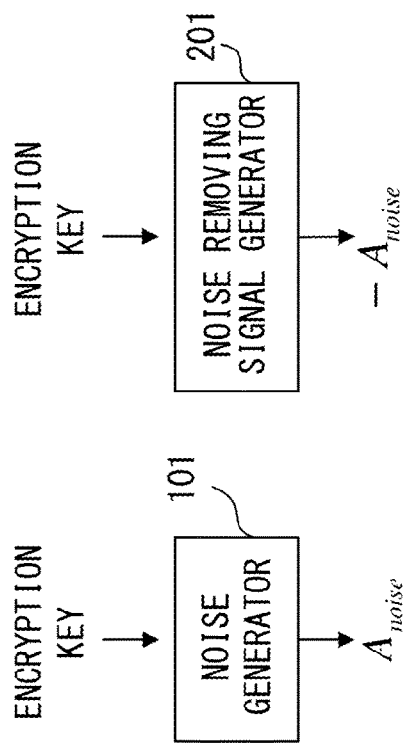
FIG. 25 illustrates an example of a method of generating amplitude noise from an encryption key.

Note that the encryption may be performed by using both the phase and the amplitude. In a case in which the embodiment in FIG. 11 and the embodiment in FIG. 25 are combined as an example, an 8-bit encryption key is used. For example, a phase noise is generated according to the upper 4 bits of an encryption key and an amplitude noise is generated according to the lower 4 bits of the encryption key.

Seventh Embodiment

In a case in which polarization-multiplexed optical signals are delivered between a transmitter 100 and a receiver 200, physical layer encryption may be realized by adding noise to polarization rotation. In a case of a 4-bit encryption key, for example, polarization rotations $\theta_{noise}$ in FIG. 26 are generated as cryptic noise.

A noise adder 101 executes an operation of the following formula (5). $E_{x0}$ and $E_{y0}$ represent an X-polarized signal and a Y-polarized signal, respectively, which are input to the noise adder 101. $E_x$ and $E_y$ represent an X-polarized signal and a Y-polarized signal, respectively, which are output from the noise adder 101.

$$\begin{pmatrix} E_x \\ E_y \end{pmatrix} = \begin{pmatrix} \cos\theta_{noise} & -\sin\theta_{noise} \\ \sin\theta_{noise} & \cos\theta_{noise} \end{pmatrix} \begin{pmatrix} E_{x0} \\ E_{y0} \end{pmatrix} \quad (5)$$

A noise remover 205 executes an operation of the following formula (6). $E_{x0}$ and $E_{y0}$ represent an X-polarized signal and a Y-polarized signal, respectively, which are input to the noise remover 205. $E_x$ and $E_y$ represent an X-polarized signal and a Y-polarized signal, respectively, which are output from the noise remover 205.

$$\begin{pmatrix} E_x \\ E_y \end{pmatrix} = \begin{pmatrix} \cos(-\theta_{noise}) & -\sin(-\theta_{noise}) \\ \sin(-\theta_{noise}) & \cos(-\theta_{noise}) \end{pmatrix} \begin{pmatrix} E_{x0} \\ E_{y0} \end{pmatrix} \quad (6)$$

Note that the encryption may be performed by using both the phase and the polarization rotation. The encryption may also be performed by using both the amplitude and the polarization rotation. In addition, the encryption may also be performed by combining the phase, the amplitude and the polarization rotation.

<Variation>

When a physical layer encryption communication in FIG. 10A to FIG. 26 are disrupted, the physical layer encryption communication may be resumed in accordance with the procedures in FIG. 4 to FIG. 7. In this case, the known pattern signal 1 in FIG. 21 corresponds to the known pattern X or the encryption start notice pattern in FIG. 5. The known pattern signal 2 in FIG. 21 corresponds to the known pattern Y in FIG. 5.

The communication devices in FIG. 8 and FIG. 9 (the transmitter 11a and the transmitter 12b) may be provided with functions in FIG. 14 to FIG. 26. Assume that functions in the first embodiment in FIG. 14 to FIG. 17 are employed in the communication devices in FIG. 8 and FIG. 9 as an example. In this case, the functions of the noise generator 101, the noise adder 102, and the noise controller 111 in FIG. 14 are implemented by the pseudo-random number generator 15 and the transmission symbol generator 29 in FIG. 8. In addition, the functions of the noise removing signal generator 201, the noise remover 205, and the remaining noise detector 211 in FIG. 14 are implemented by the pseudo-random number generator 18 and the signal regenerator 42 in FIG. 9.

In this case, the transmission symbol generator 29 generates cryptic noise that corresponds to pseudo-random numbers generated by the pseudo-random number generator 15 and adds cryptic noise for each symbol of transmission signals. In addition, the transmission symbol generator 29 corrects, in accordance with remaining noise information reported from a receiver, electric field information of symbols that are generated by adding cryptic noise to transmission signals.

The signal regenerator 42 generates noise removing signals that correspond to pseudo-random numbers generated by the pseudo-random number generator 18 and removes cryptic noise from received signals by using the noise removing signals. The signal regenerator 42 detects a phase shift and an amplitude shift of received signals from which cryptic noise is removed. As described with reference to FIG. 15 and other drawings, a phase shift and an amplitude shift are detected by using known pattern signals. Remaining noise information that represents a phase shift and an amplitude shift is reported to the transmission symbol generator 29. The transmission symbol generator 29 corrects each symbol based on the reported phase shift and amplitude shift.

Note that in the embodiments in FIG. 14 to FIG. 26, the functions of the noise generator 101, the noise adder 102, the noise controller 111, the transmission parameter setting unit 151, and the encryption key bit length changing unit 152 are implemented by, for example, a processor system including a processor and a memory. In this case, the processor provides the functions of the noise generator 101, the noise adder 102, the noise controller 111, the transmission parameter setting unit 151, and the encryption key bit length changing unit 152 by executing programs stored in the memory. Here, some of the functions of the noise generator 101, the noise adder 102, the noise controller 111, the transmission parameter setting unit 151, and the encryption key bit length changing unit 152 may be implemented by a hardware circuit.

The functions of the noise removing signal generator 201, the noise remover 205, the remaining noise detector 211, the noise removing signal controller 212, the known pattern signal detector 221, the timing adjuster 222, and the encryption key bit length changing unit 231 can be implemented by, for example, a processor system including a processor and a memory. In this case, the processor provides the functions of the noise removing signal generator 201, the noise remover 205, the remaining noise detector 211, the noise removing signal controller 212, the known pattern signal detector 221, the timing adjuster 222, and the encryption key bit length changing unit 231 by executing programs stored in the memory. Here, some of the functions of the noise removing signal generator 201, the noise remover 205, the remaining noise detector 211, the noise removing signal controller 212, the known pattern signal detector 221, the timing adjuster 222, and the encryption key bit length changing unit 231 may be implemented by a hardware circuit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication device that communicates with a correspondent device, the communication device comprising:
   a counter configured to count symbols transmitted to the correspondent device;
   a pseudo-random number generator configured to generate a pseudo-random number corresponding to a count value of the counter;
   a symbol generator configured to generate a transmission symbol from a transmission signal and the pseudo-random number generated by the pseudo-random number generator;
   a modulator configured to generate a modulated signal from the transmission symbol generated by the symbol generator; and
   a controller configured to select, when a disruption of a communication with the correspondent device is detected, a restoring time for resuming the communication based on a time at which the disruption of the communication is detected, the restoring time being selected from among a plurality of restoring times determined in advance, and to give the counter a count value assigned in advance to the selected restoring time, wherein
   the counter resumes a counting operation from the count value given from the controller when the communication device resumes a communication with the correspondent device.

2. The communication device according to claim 1, wherein
   the pseudo-random number that is generated by the pseudo-random number generator and that corresponds to a new count value generated by the counter is not predicted from a pseudo-random number that is generated by the pseudo-random number generator and that corresponds to a count value generated in the past by the counter.

3. A communication device that communicates with a correspondent device, the communication device comprising:
   a counter configured to count symbols received from the correspondent device;
   a pseudo-random number generator configured to generate a pseudo-random number corresponding to a count value of the counter;
   a signal regenerator configured to regenerate a transmission signal from a modulated signal received from the correspondent device by using the pseudo-random number generated by the pseudo-random number generator; and a controller configured to select, when a disruption of a communication with the correspondent device is detected, a restoring time for resuming the communication based on a time at which the disruption of the communication is detected, the restoring time being selected from among a plurality of restoring times determined in advance, to give the counter a count value assigned in advance to the selected restoring time, wherein the counter resumes a counting operation from the count value given from the controller when the communication device resumes a communication with the correspondent device.

4. A communication system that performs a communication between a first communication device and a second communication device, the first communication device comprising;
  a first clock;
  a first counter configured to count symbols transmitted to the second communication device;
  a first pseudo-random number generator configured to generate a pseudo-random number that corresponds to a count value of the first counter;
  a symbol generator configured to generate a transmission symbol from a transmission signal and the pseudo-random number generated by the first pseudo-random number generator;
  a modulator configured to generate a modulated signal from the transmission symbol generated by the symbol generator; and
  a first controller configured to detect, when disruption of a communication with the second communication device is detected, a time at which the disruption of the communication is detected by using the first clock, to select a restoring time for resuming the communication based on the time at which the disruption of the communication is detected, the restoring time being selected from among a plurality of restoring times determined in advance, to give the first counter a count value assigned in advance to the selected restoring time, the second communication device comprising:
  a second clock;
  a second counter configured to count symbols received from the first communication device;
  a second pseudo-random number generator configured to generate a pseudo-random number that corresponds to a count value of the second counter;
  a signal regenerator configured to regenerate the transmission signal from the modulated signal received from the first communication device by using the pseudo-random number generated by the second pseudo-random number generator; and
  a controller configured to detect, when a disruption of a commutation with the first communication device is detected, a time at which the disruption of the communication is detected by using the second clock, to select a restoring time for resuming the communication based on the time at which the disruption of the communication is detected, the restoring time being selected from among the plurality of restoring times, to give the second counter a count value assigned in advance to the selected restoring time, wherein when the first communication device resumes a communication with the second communication device, the first counter resumes a counting operation from the count value given from the first controller, and wherein when the second communication device resumes a communication with the first communication device, the second counter resumes a counting operation from the count value given from the second controller.

5. The communication system according to claim 4, wherein
  the plurality of restoring times are set at specific time intervals,
  the first clock and the second clock are activated simultaneously, and
  each of the time intervals is a time period longer than a time period obtained by multiplying a sum of an accuracy of the first clock and an accuracy of the second clock by an elapsed time from activation of the first clock and the second clock.

6. The communication system according to claim 4, wherein
  the first clock and the second clock are simultaneously activated, and
  a count value assigned to a restoring time is larger than a product of an elapsed time from activation of the first clock and the second clock to the restoring time, a value obtained by adding 1 to a smaller one of values of an accuracy of the first clock and an accuracy of the second clock, and a symbol rate of a signal transmitted from the first communication device to the second communication device.

7. The communication system according to claim 4, wherein
  when the second communication device detects disruption of a communication between the first communication device and the second communication device, the second communication device reports to the first communication device that the disruption of the communication is detected, and
  the first communication device detects the disruption of the communication between the first communication device and the second communication device from the report.

8. The communication system according to claim 4, wherein
  the first communication device reports to the second communication device a timing to start an encrypted communication that uses a pseudo-random number generated by the first pseudo-random number generator, and
  the second communication device starts the encrypted communication that uses a pseudo-random number generated by the second pseudo-random number generator based on the report.

* * * * *